(12) United States Patent
Atherton

(10) Patent No.: US 9,606,525 B2
(45) Date of Patent: Mar. 28, 2017

(54) REMOTE ACCESSORY FOR GENERATING CUSTOMIZED AND SYNCHRONIZED REFERENCE NOTES FOR A PROGRAMMABLE METROLOGY SYSTEM

(71) Applicant: Mitutoyo Corporation, Kanagawa-ken (JP)

(72) Inventor: Kim Atherton, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 541 days.

(21) Appl. No.: 14/139,591

(22) Filed: Dec. 23, 2013

(65) Prior Publication Data
US 2015/0177729 A1 Jun. 25, 2015

(51) Int. Cl.
G05B 19/401 (2006.01)
(52) U.S. Cl.
CPC .... G05B 19/401 (2013.01); *G05B 2219/2611* (2013.01)
(58) Field of Classification Search
CPC ................ G05B 19/401; G05B 19/409; G05B 2219/2611
See application file for complete search history.

(56) References Cited

U.S. PATENT DOCUMENTS 4,488,258 A * 12/1984 Struger ................ G05B 19/056
700/18
6,044,569 A 4/2000 Ogihara et al.
6,397,378 B1 * 5/2002 Grey ................... G06F 11/3688
714/E11.207
6,542,180 B1 4/2003 Wasserman et al.
(Continued)

OTHER PUBLICATIONS

Microsoft, "Copy and paste from a remote computer", microsoft.com, captured on Jul. 27, 2013 (accessed from <<https://web.archive.org/web/20130727000836/http://windows.microsoft.com/en-us/windows-vista/copy-and-paste-from-a-remote-computer>> on Jun. 3, 2013).*

(Continued)

*Primary Examiner* — Kenneth M Lo
*Assistant Examiner* — Michael J Huntley
(74) *Attorney, Agent, or Firm* — Seed IP Law Group LLP

(57) ABSTRACT

A method for operating a remote device in relation to a programming environment of a programmable metrology system is provided. The metrology system may comprise an accessory interface portion comprising an accessory communication portion, and a user interface comprising a programming environment having part program instruction representation representations in an editing window, including an active "current instruction" representation. The method provides a connection between the remote device and the programming environment, which outputs current instruction identifiers for current instruction representations. The remote device receives a current instruction identifier and operates responsive to the that current instruction identifier to display a current instruction reference information user interface portion configured such that it is specifically related to a generic instruction type corresponding to the current instruction representation. That user interface may display customized reference information previously configured by a user of the remote device in association with that generic instruction type.

20 Claims, 13 Drawing Sheets

(56) References Cited

U.S. PATENT DOCUMENTS

| | | | |
|---|---|---|---|
| 6,691,301 B2* | 2/2004 | Bowen | G06F 17/5045 |
| | | | 712/15 |
| 6,732,111 B2 | 5/2004 | Brodersen et al. | |
| 7,089,530 B1* | 8/2006 | Dardinski | G05B 15/02 |
| | | | 700/83 |
| 7,251,580 B2 | 7/2007 | Nomura et al. | |
| 7,272,815 B1* | 9/2007 | Eldridge | G06F 8/71 |
| | | | 707/999.009 |
| 7,324,682 B2 | 1/2008 | Wasserman | |
| 7,454,053 B2 | 11/2008 | Bryll et al. | |
| 7,506,059 B2 | 3/2009 | Mulligan | |
| 8,028,085 B2 | 9/2011 | Elien et al. | |
| 8,111,905 B2 | 2/2012 | Campbell | |
| 8,111,938 B2 | 2/2012 | Bryll et al. | |
| 8,346,929 B1 | 1/2013 | Lai | |
| 8,516,712 B2 | 8/2013 | Kumagai et al. | |
| 8,539,061 B2 | 9/2013 | Shi | |
| 9,213,331 B2* | 12/2015 | Johnson | G05B 19/409 |
| 2003/0037321 A1* | 2/2003 | Bowen | G06F 17/5045 |
| | | | 717/149 |
| 2003/0088854 A1* | 5/2003 | Wygodny | G06F 11/3636 |
| | | | 717/130 |
| 2004/0123271 A1* | 6/2004 | Bindewald | G06F 11/362 |
| | | | 717/124 |
| 2005/0021281 A1* | 1/2005 | Friedrich | G05B 15/02 |
| | | | 702/150 |
| 2005/0085940 A1* | 4/2005 | Griggs | G05B 19/401 |
| | | | 700/181 |
| 2006/0058894 A1* | 3/2006 | Liu | G05B 19/409 |
| | | | 700/17 |
| 2006/0171580 A1* | 8/2006 | Blanford | G01N 21/8806 |
| | | | 382/141 |
| 2011/0252404 A1* | 10/2011 | Park | G06F 11/3664 |
| | | | 717/124 |
| 2011/0310270 A1* | 12/2011 | Gladnick | G01N 21/8806 |
| | | | 348/229.1 |
| 2012/0229662 A1* | 9/2012 | Lankalapalli | G05B 19/409 |
| | | | 348/211.8 |

OTHER PUBLICATIONS

U.S. Appl. No. 13/297,232, filed Nov. 15, 2011, entitled "Machine Vision System Program Editing Environment Including Real Time Context Generation Features," 67 pages.

U.S. Appl. No. 13/676,061, filed Nov. 13, 2012, entitled "Machine Vision System Program Editing Environment Including Synchronized User Interface Features," 70 pages.

Mitutoyo Corporation & Micro Encoder Inc., "QVPak 3D CNC Vision Measuring Machine Operation Guide," Version 2.0, published Sep. 1996, 86 pages.

Mitutoyo Corporation & Micro Encoder Inc.,"QVPak 3D CNC Vision Measuring Machine User's Guide," Version 7, published Jan. 2003, 329 pages.

* cited by examiner

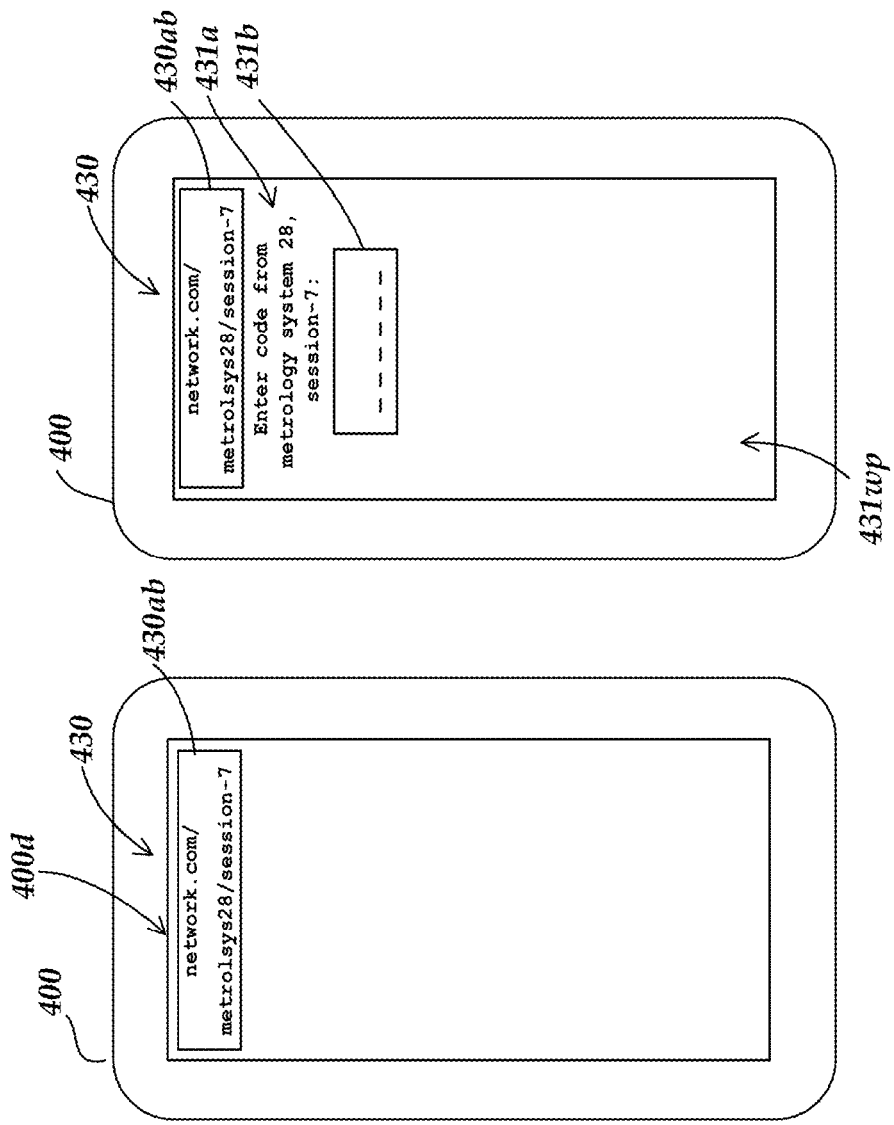

REMOTE ACCESSORY FOR GENERATING CUSTOMIZED AND SYNCHRONIZED REFERENCE NOTES FOR A PROGRAMMABLE METROLOGY SYSTEM

BACKGROUND

Commonly used programmable metrology systems may include a machine vision inspection system (MVIS) and/or a coordinate measuring machine (CMM). One exemplary prior art MVIS, which can be characterized as a general-purpose "off-line" precision vision system, is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in its entirety.

General purpose precision machine vision inspection systems, such as the QUICK VISION™ system, are generally programmable to provide automated video inspection. Such systems typically include GUI features and predefined image analysis "video tools" such that operation and programming can be performed by "non-expert" operators. For example, U.S. Pat. No. 6,542,180 (hereinafter "the '180 patent"), which is incorporated herein by reference in its entirety, teaches such a vision system that uses automated video inspection. As taught in the '180 patent, automated video inspection metrology instruments generally have a programming capability that allows an automatic inspection event sequence to be defined by the user for each particular workpiece configuration. Such programming can be implemented as text-based programming, or through a recording mode that progressively "learns" the inspection event sequence by storing a sequence of machine control instructions and individual video tool parameters corresponding to a sequence of inspection operations defined and/or performed by a user (e.g., with the aid of various semi-automatic or automatic video tool operations), or through a combination of both methods. Such a recording mode is often referred to as "learn mode" or "training mode." In either technique, the machine control instructions and individual video tool parameters are generally stored as a part program that is specific to the particular workpiece configuration, and automatically perform a predetermined sequence of inspection operations during a "run mode" of operation. Part programs for CMMs may be programmed in analogous ways. Exemplary CMMs are disclosed, for example, in U.S. Pat. Nos. 7,251,580; 6,044,569; and 8,516,712, each of which is hereby incorporated herein by reference in its entirety.

Many users and programmers of such metrology systems use the recording mode outlined above in order to create and/or edit part programs. The resulting part program operations or instructions may be represented to such users in a simplified graphical representation, or the like. Many metrology systems are designed such that unskilled users need not view or comprehend the underlying part programming language instructions. Some of the commercially available simplified graphical representations of part programs include the ability to add explanatory and or supplementary information to the part program representation by simplified "comment" statements, or the like. However, such capabilities are typically rudimentary. Adding extensive and/or complex supplementary information (e.g. personalized user notes or explanations) at a particular location in a part program representation, and such that it is easily accessible or viewable, is presently beyond the capability of most such systems and most users.

Furthermore, metrology system programming environments have conventionally only been linked to dedicated remote devices such as dedicated tablet devices or teaching pendants, or the like, for example as disclosed in US Patent Application Publication No. 2012/0229662 A1, which is hereby incorporated herein by reference in its entirety. The requirement for such remote devices to have dedicated and/or specially programmed interface features constrains both their availability and their operation. Similar to their associated host systems, such dedicated remote devices may require their users to have specialized training to operate them in conjunction with their host system. Also similar to their associated host systems, such dedicated remote devices are generally shared among a number of users, and it is not desirable for a single user to customize them for their personal idiosyncrasies, nor possess them and transport them for their exclusive use. Furthermore, the user interfaces for such remote devices have typically not been directed toward the problem of making it easy for relatively unskilled users to view and/or create customized supplementary information (e.g. reference information or explanations) associated with a particular instruction, or a particular type of instruction, in a part program while operating in a programming environment for the host system. It would be desirable for a user to be able to view supplementary or reference information associated with a particular instruction or type of instruction in a part program while operating in a programming environment for the host system, without encountering the aforementioned constraints and deficiencies in the available hardware and methods at their disposal. For example, it would be desirable for a single user to customize such reference information for their personal idiosyncrasies, easily locate a minimal amount of information that is customized according to their needs, store such information on a device that they typically possess and/or transport them for their exclusive use, and easily connect that device to the programming environment of a corresponding programmable metrology system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A-7B show one embodiment of user interface features and operations usable on a remote device to connect the remote device to a metrology system programming environment.

DETAILED DESCRIPTION

In contrast to the previously outlined constraints and deficiencies associated with the use of dedicated remote devices related to programmable metrology systems, relatively unskilled users of such systems may frequently carry personal computing and/or file storage devices (e.g. tablets or smart phones, or the like) which they are already familiar with. On such devices they may desire to keep personal notes, files, and/or pictures which help them document and remember programming commands and/or system training, special workpiece/or setup features, or other considerations related to part programming. Furthermore, such personal computing and/or file storage devices frequently include cameras, Internet browsers, and other devices and programs with which the user is familiar with and may prefer to use for generating additional reference information in relation to part programming. However, relatively unskilled users lack the capability to connect such familiar personal devices to metrology systems as remote accessories. However, the programming environments of metrology systems have not included features which facilitate the connection of such devices, or features that allow convenient interaction between the programming environment and such remote devices not normally associated with the programmable metrology system.

Personal mobile or remote devices such as tablets or smart phones or the like have become more versatile and it would be desirable if programmable metrology systems included features such that they could easily be connected to provide the "free", familiar, readily available functionality of such remote devices to supplement the native operations and programming environment capability of such metrology systems.

As disclosed herein, remote devices not normally associated with a metrology system may cooperatively interact a programming environment of metrology systems in order to view and/or create reference information which may aid a user in programming a metrology system. In particular, such devices may be linked in a configuration with metrology systems such that relatively unskilled users may view and/or create supplementary or reference information associated with a particular instruction or type of instruction in a part program and/or its representation in an editing environment, while creating and/or editing a part programs. In various embodiments the remote device and/or the programming environment may be configured such that the remote device operates in a way that is synchronized with an instruction or type of instruction that is the "active" current instruction in the programming environment. In various embodiments, the supplementary or reference information may comprise, or consist of, information that is customized and stored on the remote device by a frequent user of the remote device (e.g. its owner).

Figure 1:
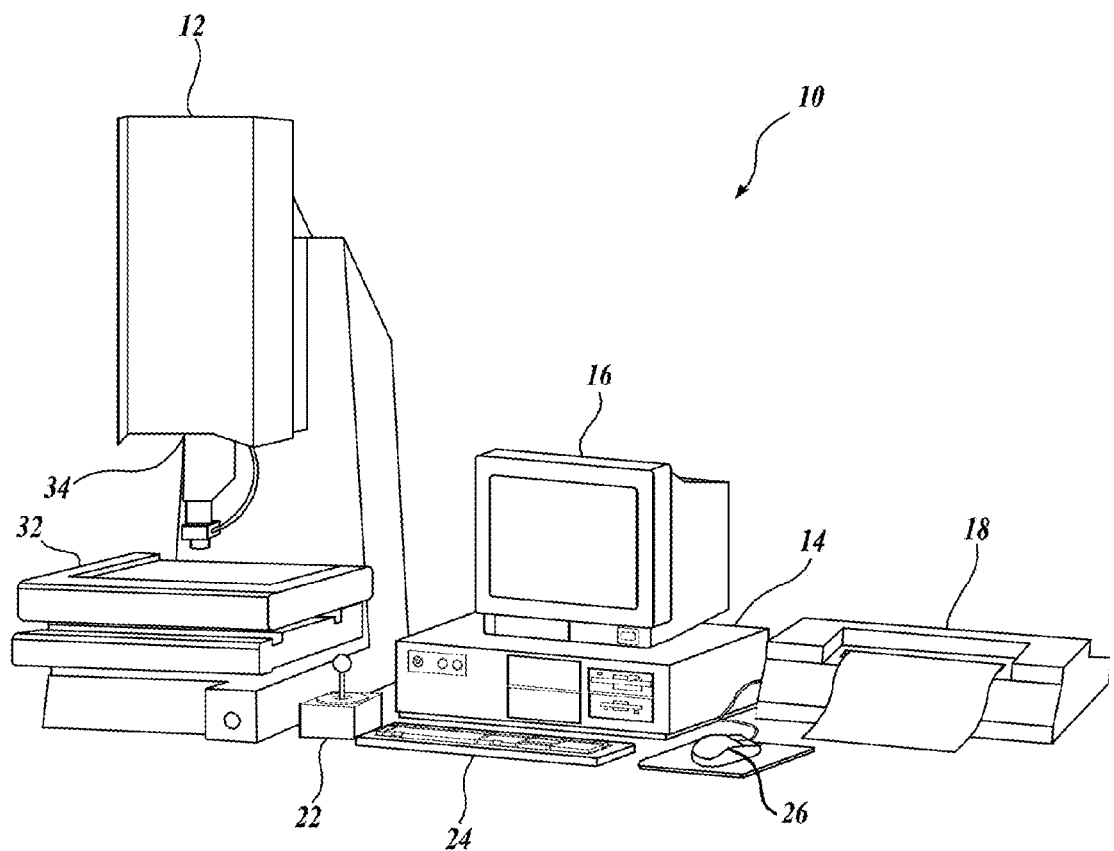
FIG. 1 is a diagram showing various typical components of a general purpose precision machine vision inspection system.

FIG. 1 is a diagram showing various typical components of one exemplary programmable metrology system which in this example is a machine vision inspection system 10 usable in accordance with methods described herein. The machine vision inspection system 10 includes a vision measuring machine 12 that is connected to exchange data and control signals (e.g. through a connector or wireless connection) with a controlling computer system 14. The controlling computer system 14 is further connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various embodiments, a touchscreen tablet or the like may be substituted for and/or redundantly provide the functions of any or all of the computer system 14, the display 16, the joystick 22, a keyboard 24, and the mouse 26.

The controlling computer system 14 may generally consist of any computing system or device such as a personal computer, server computer, minicomputer, mainframe computer, distributed computing environment that includes any of the foregoing, and the like. One or more general-purpose or custom processors and associated systems may execute software according to any appropriate known method to perform the functions described herein. Software may be stored in any appropriate known memory or known storage device. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The machine vision inspection system 10 is generally comparable to the QUICK VISION® series of vision systems and the QVPAK® software discussed above, and similar state-of-the-art commercially available systems. The machine vision inspection system 10 is also described in commonly assigned U.S. Pat. Nos. 7,454,053; 7,324,682; 8,111,905; and 8,111,938 each of which is incorporated herein by reference in its entirety.

Figure 2:
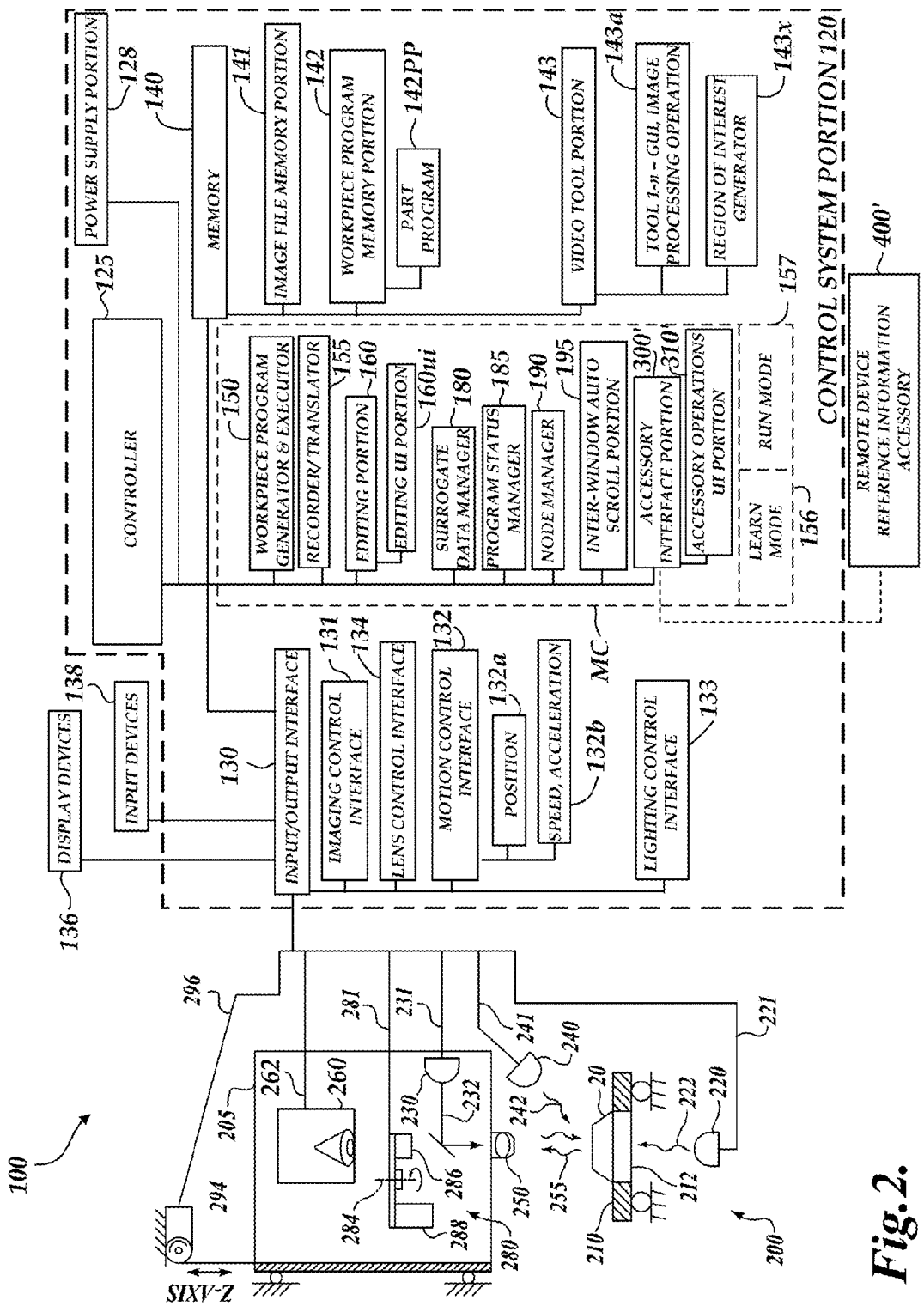
FIG. 2 is a block diagram of a control system portion and a vision components portion of a machine vision inspection system similar to that of FIG. 1, and including features described herein.

FIG. 2 is a block diagram of a control system portion 120 and a vision components portion 200 of a machine vision inspection system 100 similar to the machine vision inspection system of FIG. 1, and includes features usable in various embodiments according to the principles described herein. The control system portion 120 is utilized to control the vision components portion 200. As shown in FIG. 2, the vision components portion 200 includes an optical assembly portion 205, light sources 220, 230, and 240 (connected through signal lines or busses 221, 231, and 241, respectively), and a workpiece stage 210 having a central transparent portion 212. The workpiece stage 210 is movable along X and Y axes, in a plane that is generally parallel to the surface of the stage which may hold a workpiece 20. The optical assembly portion 205 includes a camera system 260, an interchangeable objective lens 250, and may include a turret lens assembly 280, or an interchangeable magnification-altering lens, or the like. The optical assembly portion 205 is movable along a Z axis that is orthogonal to the X and Y axes, using a motor 294, to change the focus of the image captured by the camera system 260. The term Z axis refers to the axis that is used for focusing an image. The motor 294 is connected to the interface 130 via a signal line 296.

A workpiece 20 may be placed on the workpiece stage 210, which is controlled such that the interchangeable objective lens 250 moves between locations on the workpiece 20. One or more of the lights may emit respective source light 222, 232, or 242, to illuminate the workpiece 20, and reflected or transmitted workpiece light 255 passes through the objective lens 250 and the turret lens assembly 280 two the camera system 260. The image captured by the camera system 260 is output on a signal line 262 to the control system portion 120. To alter the image magnification, the rotation of the turret lens assembly 280 may be controlled through a signal line or bus 281.

As shown in FIG. 2, in various exemplary embodiments, the control system portion 120 includes a controller 125, a power supply portion 128, the input/output interface 130, a memory 140, a workpiece program generator and executor 150, a recorder/translator 155, and a learn mode portion 156, a run mode portion 157, and editing portion 160, a surrogate data manager 180, a program status manager 185, a node manager 190, an inter-window auto-scroll portion 195, and an accessory interface portion 300' which may be used to connect to remote device reference information accessory 400', as described in greater detail below. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The lighting control interface 133 controls the selection, power, on/off switch, and strobe pulse timing if applicable, for the various corresponding light sources.

The memory 140 includes an image file memory portion 141, a workpiece program memory portion 142 that may include a part program 142PP, or the like, and a video tool portion 143. The video tool portion 143 includes video tool portion 143a and other video tool portions, which determine the GUI, image processing operation, etc., for each of the corresponding video tools. The video tool portion 143 also includes a region of interest (ROI) generator 143x that supports automatic, semi-automatic and/or manual operations that define various ROIs that are operable in various video tools included in the video tool portion 143.

In general, the memory portion 140 stores data usable to operate the vision system to acquire an image of the workpiece 20 that has desired image characteristics. The memory portion 140 may also store inspection result data, may further store data usable to operate the machine vision inspection system 100 to perform various inspection and measurement operations on the acquired images (e.g., implemented, in part, as video tools), either manually or automatically, and to output the results through the input/output interface 130. The memory portion 140 may also contain data defining a user interface operable through the input/output interface 130.

The signal lines of the lights, the signal line 262 from the camera system 260 and the signal line 296 from the motor 294 are all connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various user interface features that are usable to perform various inspection operations, and/or to create and/or modify part programs, to view the images captured by the camera system 260, and/or to directly control the vision system components portion 200. In various embodiments, the display devices 136 and input devices 138 are used to present various user interface features usable to allow rapid, efficient, intuitive, and flexible editing of part programs on the machine vision inspection system 100.

The workpiece program generator and executor 150, recorder/translator 155, learn mode portion 156, run mode portion 157, editing portion 160, surrogate data manager 180, program status manager 185, node manager 190, inter-window auto scroll portion 195 and the accessory interface portion 300' may in one embodiment all be considered to be part of a general machine controller block MC that is linked to the controller 125. Additionally, the remote device reference information accessory 400', described in greater detail below, may be linked to the controller 125 (e.g. through the accessory interface portion 300'). The remote device information accessory 400' may be considered to be an accessory outside of, but communicating to inter-operate with, the control system portion 120 in some embodiments. The workpiece program generator and executor 150 is responsible for creating and executing part programs. The terms "workpiece program" and "part program" may be used interchangeably herein.

In accordance with the operations of the workpiece program generator and executor 150, a user creates a part program for the workpiece 20, the user generates part program instructions either by explicitly coding the instructions using a workpiece programming language, or preferably, by generating the instructions by operating the machine vision inspection system 100 in a learn mode (e.g., as controlled by the learn mode portion 156) to provide a desired image acquisition training sequence. For example, a training sequence may comprise positioning a workpiece feature in the field of view (FOV), setting light levels, focusing or autofocusing, acquiring an image, and providing an inspection training sequence applied to the image (e.g., using video tools). The learn mode operates such that the sequence(s) are captured or recorded and converted to corresponding part program steps (i.e., instructions). These part program steps, when the part program is executed in a run mode (e.g., as controlled by the run mode portion 157), will cause the machine vision inspection system to reproduce the trained image acquisition and inspection operations to automatically inspect a workpiece or workpieces matching the workpiece used when creating the part program.

The recorder/translator 155 is utilized for translating machine operations into part program code. In other words, if a user performs an action (e.g., such as altering a video tool that is used to measure a feature on a workpiece) an instruction is generated that is translated into a machine readable language, and a reverse translation may also be performed. As will be described in more detail below, instructions in a part program may also be translated into instruction representations in a user interface. In some embodiments, the part program instructions may be written in a markup type language code. In one specific example embodiment, the markup language code may be XML code. The editing portion 160 provides or activates various operations and user interface features related to editing a part program within an editing user interface portion 160*ui*, which may include a part program representation window as described in greater detail below.

The surrogate data manager 180 need not be present, but may be used in some embodiments. Briefly, the surrogate data manager 180 links to surrogate data, which may be recorded in a part program such that the program operation may be rapidly executed in a simulation mode using the surrogate during learn mode operations, in order to support editing operations. The surrogate data manager 180 is described in greater detail in commonly assigned U.S. patent application Ser. No. 13/297,232 (the '232 application), which is hereby incorporated herein by reference in its entirety.

The program status manager 185, in one embodiment, manages whether programs are protected or unprotected. In one implementation, an unprotected part program may include stored surrogate data, while a protected part program has surrogate data removed. In one example embodiment, protected programs are programs for which the editing process has been completed, such as may be utilized in a factory in a run mode.

In one embodiment, the node manager 190 is responsible for managing node numbers that are assigned to nodes in a part program. In one implementation, within a representation of a part program, each of the instruction representations is assigned a node number. In certain implementations, an organizational tree structure may be utilized wherein there are parent nodes and child nodes. In certain implementations, every line of a part program representation that is generated by the recorder/translator 155 is assigned a node number, or a guaranteed unique identifier, of the like by the node manager 190. As described in greater detail in commonly assigned U.S. patent application Ser. No. 13/676,061 (the '061 application), which is hereby incorporated herein by reference in its entirety, in some embodiments the inter-window auto scroll portion 195 may utilize the node numbers assigned by the node manager 190 to display associated part program elements and corresponding editing functions in different windows at the same time. In other words, if a user wishes to see which measurements of a workpiece are related to which instruction representations and coded instructions in a part program, the inter-window auto scroll portion 195 will automatically scroll in the respective windows to the relevant lines in the part program representation and/or coded instructions that correspond to the relevant node number. One exemplary method and/or implementation of inter-window communication is described below, with reference to FIG. 11. In some embodiments, the accessory interface portion 300' may interoperate with the node manager 190 and/or the inter-window auto scroll portion 195 using an analogous method, such that the accessory operations user interface portion 310' and/or the remote device reference information accessory 400' may receive and/or send active node number information and/or the associated part program instruction representations, or the like, according to principles and operations disclosed herein.

Regarding FIG. 2, many features of FIG. 2 may be further understood based on the descriptions of their analogous or substantially similar counterparts which are similarly depicted, described and/or referenced elements in the previously incorporated co-pending '232 and '061 applications.

Figure 3:
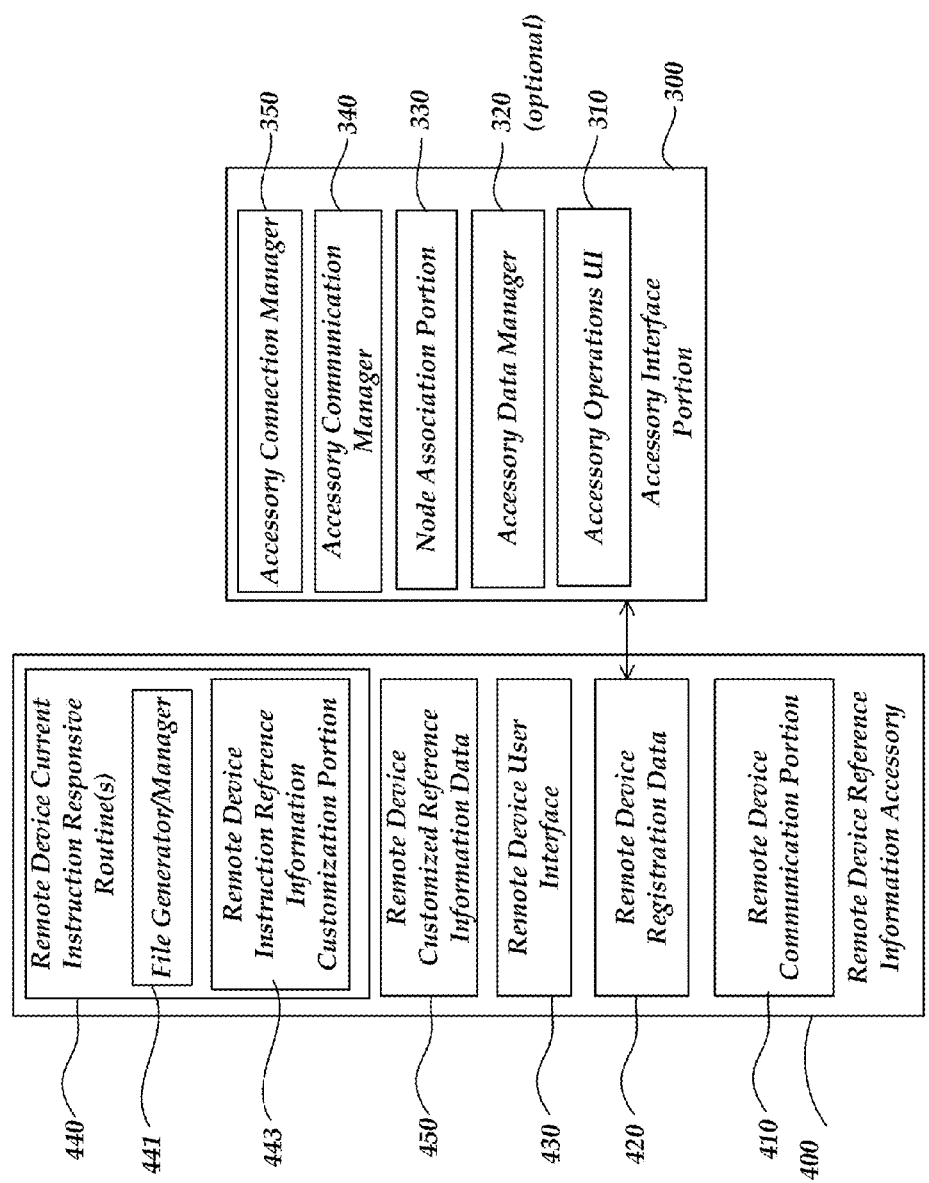
FIG. 3 is a block diagram of one exemplary embodiment of an accessory interface portion usable in a programming environment of a metrology system, and one exemplary embodiment of a remote device useable as a remote device reference information accessory when connected to the accessory interface portion.

FIG. 3 is a block diagram of one exemplary embodiment of an accessory interface portion 300 usable in a programming environment of a metrology system (e.g. as the accessory interface portion 300' shown in FIG. 2), and one exemplary embodiment of a remote device useable as a remote device reference information accessory 400 (e.g. as the remote device reference information accessory 400' shown in FIG. 2) when connected to the accessory interface portion 300. In the embodiment shown in FIG. 3, the accessory interface portion 300 comprises an accessory operations user interface 310, an (optional) accessory data manager 320, a node association portion 330, an accessory communication manager 340 and an accessory connection manager 350. The remote device reference information accessory 400 comprises a remote device communication portion 410, remote device registration data 420, a remote device user interface 430, remote device customized reference information data 450, and a remote device current instruction responsive portion 440, which in the embodiment shown in FIG. 3 may include a remote device file generator/manager 441 and a remote device instruction reference information customization portion 443.

Generally speaking, the accessory interface portion 300 and the remote device current instruction responsive portion 440 (and other elements shown in FIG. 3) are configured to provide relatively unskilled users with the capability to connect familiar personal devices to a metrology system as remote accessories to be used while creating and editing part programs. This is accomplished, for example, by providing user interface features and operations which facilitate the connection of such devices, and features that allow users to easily view and/or create supplementary or reference information associated with a particular instruction or type of instruction in a part program and/or its representation in an editing environment, while creating and/or editing a part programs.

In various embodiments, the accessory interface portion 300 and the features included in the remote reference device information accessory 400 are configured such that ease of connection and ease-of-use of the remote device reference information accessory 400 in association with a metrology system programming environment is particularly emphasized. The accessory operations user interface 310 and the remote device user interface 430 may include commands, dialog boxes and other display elements to support this emphasis, for example as outlined below with reference to an exemplary embodiment shown in FIGS. 6-9. The accessory communication manager 340 and the remote device communication portion 410 may include device communication circuits and/or routines to support this emphasis, for example as outlined below with reference to an exemplary embodiment shown in FIG. 10. The accessory communication manager 340 and the remote device communication portion 410 may facilitate communications between the programming environment and the remote device reference information accessory 400 to support the operations of other elements shown in FIG. 3.

The accessory connection manager 350 may include connection routines and related user interface features which register a remote device in relation to a metrology system programming environment, for example as outlined below with reference to an exemplary embodiment shown in FIGS. 6-7. The accessory data manager 320 may operate in cooperation with the node association portion 330 in order to receive and/or display particular reference information exchanged between the remote device reference information accessory 400 and the programming environment in association with a particular part program instruction representation (e.g. a current part program instruction representation) in the programming environment. In some implementations it may store or display reference information received from the remote device 400 to support operations in the programming environment (e.g. as previously outlined with reference to the operations of the remote device reference information window 164w).

The node association portion 330 is configured to support the operations of other elements of the accessory interface portion 300 and/or the remote device current instruction responsive portion 440. In one embodiment, the node association portion 330 may interoperate with the node manager 190 and/or the inter-window auto scroll portion 195 and/or use an analogous method, such that various elements of the accessory interface portion 300 and the remote device reference information accessory 400 may exchange current node number information and/or the associated part program instruction representations and/or the associated instruction-responsive reference information, or the like, according to principles and operations disclosed herein. The node manager 190 is described in greater detail in the previously incorporated '232 and '061 applications, and one exemplary embodiment of the inter-window auto scroll portion 195 is outlined below with reference to FIG. 11.

Generally speaking, the remote device reference information accessory 400 may be any device capable storing, viewing and/or creating reference information that is relevant to a metrology system part program, and that is connectable to the accessory interface portion 300 (e.g. through a network, and/or wireless connection such as Bluetooth or Wi-Fi, or the like). However, as previously outlined, users of programmable metrology systems may frequently carry personal computing and/or file storage devices (e.g. tablets or smart phones, or the like) which they are already familiar with, and which are not dedicated or specially configured accessories of a metrology system. Such personal computing and/or file storage devices frequently include cameras, Internet browsers, and other devices and programs with which the user is familiar with and may prefer to use for viewing and/or creating instruction-specific reference information while creating a part program. According to known methods, such devices may be configured to include a locally resident application (e.g. a downloaded and installed application) that is customized to interact with a particular type of metrology system in the manner disclosed herein. For example, such a program or "app" may provide routines that provide, or are included in, the remote device current instruction responsive portion 440, and/or the remote device user interface 430. In some embodiments, in order to facilitate easy connection and/or ease-of-use, at least prior to connecting a remote device to the programming environment, the remote device need not include a stored program or application customized to interact with the programming environment. Instead, once it is connected to a metrology system, such interactive routines may be automatically downloaded, or offered for download, to the remote device reference information accessory 400. However, in some embodiments, an Internet browser and/or other applications previously resident on the remote device (and not normally associated with a metrology system) may provide all of the functions required in order to provide the features and operations disclosed herein, for example by providing significant functionality through interactive webpages managed by the accessory interface portion 300, along with cooperative features (e.g. special filename conventions and/or extensions, or the like) used on the remote device reference information accessory 400.

The remote device communication portion 410 may include device communication circuits and/or routines, for example as outlined below with reference to an exemplary embodiment shown in FIG. 10. The remote device communication portion 410 may provide and/or manage communications to and from the remote device reference information accessory 400 to support the various features and operations disclosed herein.

The remote device registration data 420 may include information and operations that identify the remote device reference information accessory 400 and support various features and operations of the accessory connection manager 350 disclosed herein, for example as outlined below with reference to an exemplary embodiment shown in FIGS. 6-7.

The remote device current instruction responsive portion 440, which may include a remote device file generator/manager 441 and/or a remote device instruction reference information customization portion 443, may operate to prepare a particular set of reference information to be viewed and/or created and stored on the remote device reference information accessory 400 in association with a particular instruction or type of instruction in a part program and/or its representation in an editing environment, while creating and/or editing a part program (e.g. as outlined below with reference to FIGS. 8A-8D.) The remote device user interface 430 may include commands, dialog boxes and other display elements to support various embodiments of the features and operations disclosed herein, as well as any required interaction with the programming environment (e.g. through the accessory interface portion 300). In some embodiments, the remote device user interface 430 may comprise features included in an installed "custom application" which also provides routines included in the remote device instruction responsive portion 440. In some embodiments, in addition to, or instead of, the features included in the aforementioned application, web page features, interactive web page features or the like, and/or features of an Internet browser and/or other applications previously resident on the remote device (and not normally associated with a metrology system) may be used in order to provide the features and operations disclosed herein.

Figure 4:
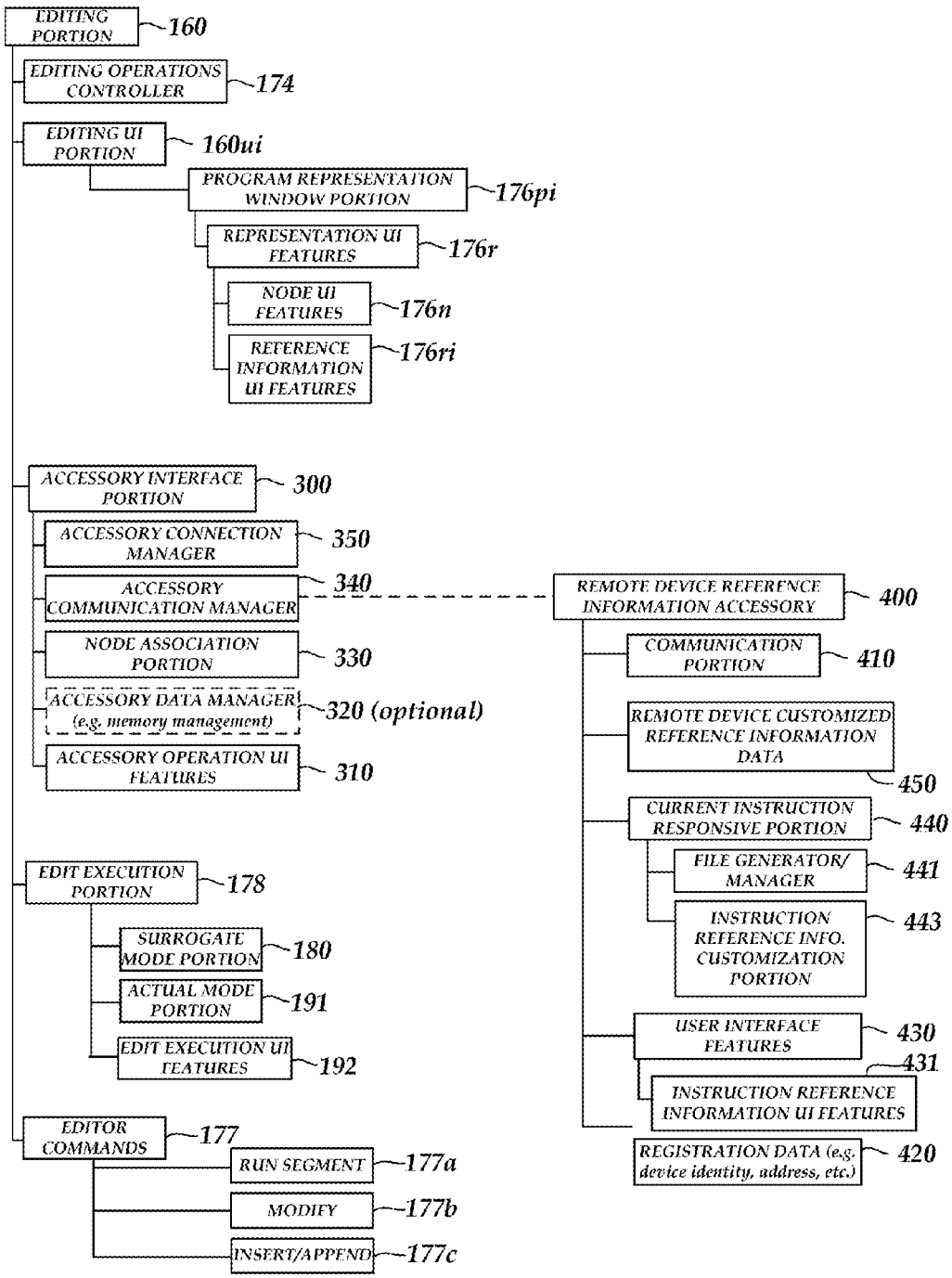
FIG. 4 is a block diagram of one exemplary embodiment of a remote device reference information accessory which may be linked to a programming environment of a metrology system through an editing portion, according to principles disclosed herein.

FIG. 4 is a block diagram of one exemplary embodiment of a remote device reference information accessory 400 which may be linked to an accessory interface portion 300 of an editing portion 160 (e.g. usable as the editing portion 160 shown in FIG. 2) according to principles disclosed herein, and other elements usable in a programming environment of a metrology system. As shown in FIG. 4, the editing portion 160 includes an editing operations controller 174, an editing user interface portion 160ui, an editor commands portion 177, and an edit execution portion 178. The editing operation controller 174 controls the operations for the editing functions, and the editing user interface portion 160ui provides the user interface features for the editing functions. The editing user interface portion 160ui includes a program representation window portion 161, which includes representation user interface features 162, which includes node user interface features 163 and reference information user interface features 164. In one embodiment, a part program representation in the program representation window may be provided in a tree structure. The representation user interface features 162 provides features such as an insertion pointer which may change color depending on the state of the context and how the context was obtained (e.g., whether the context was produced from surrogate data, by an actual run, etc.) With regard to the node user interface features 163, in one embodiment, these may include features such as icons or broken icons, and color highlights, so as to indicate if an instruction representation "node" is the active current node (that is, so as to indicate that is the target to be affected by current actions in the user interface), and so on, etc. Some exemplary embodiments of various features of the editing user interface portion 160ui and the program representation window portion 161, including some exemplary reference information user interface features 164, are described in more detail below with respect to FIGS. 5, 6, and 9, for example.

The edit execution portion 178 is responsible for various execution modes during an editing process, and includes a surrogate mode portion 180, an actual mode portion 191, and an edit execution user interface features portion 192. When the surrogate mode portion 180 operates a surrogate execution mode, surrogate data is utilized for generating context for the continuing editing operations. The actual mode portion 191 includes operations that are more traditionally performed by prior machine vision systems. The actual mode portion 191 may be called by the surrogate mode portion 180 for performing actual machine operations when appropriate. The edit execution user interface features 192 provide user interface features for the execution of the editing functions (e.g., indications as to the status of various execution operations, such as color codes indicating what portions of a part program have utilized surrogate data, or have been run through an actual execution, etc.) The elements of the edit execution portion 178 may be further understood based on the descriptions of their analogous or substantially similar counterparts which are similarly depicted, described and/or referenced elements in the previously incorporated co-pending '232 and '061 applications.

The editor commands 177 includes a run segment portion 177A, a modify portion 177B, and an insert/append portion 177C, described in detail in the '232 application.

The accessory interface portion 300 comprises an accessory operations user interface 310, an accessory data manager 320, a node association portion 330, an accessory communication manager 340 and an accessory connection manager 350. The accessory interface portion 300 and its various elements have been previously outlined with reference to FIG. 3 and are further described with reference to following figures, and need not be further described here. As shown in FIG. 4, the remote device reference information accessory 400 may be linked to communicate with the accessory interface portion 300 through the accessory communication manager 340 (e.g. as described below with reference to FIGS. 5-10), and may thereby become an accessory to the programming environment. The remote device reference information accessory 400 may comprises a remote device communication portion 410, remote device registration data 420, a remote device user interface 430, remote device customized reference information data 450, and a remote device current instruction responsive portion 440, which in the embodiment shown in FIG. 4 may include a remote device file generator/manager 441 and/or a remote device instruction reference information customization portion 443. The remote device reference information accessory 400 and its various elements have been previously outlined with reference to FIG. 3 and are further described with reference to following figures, and need not be further described here.

Figure 5:
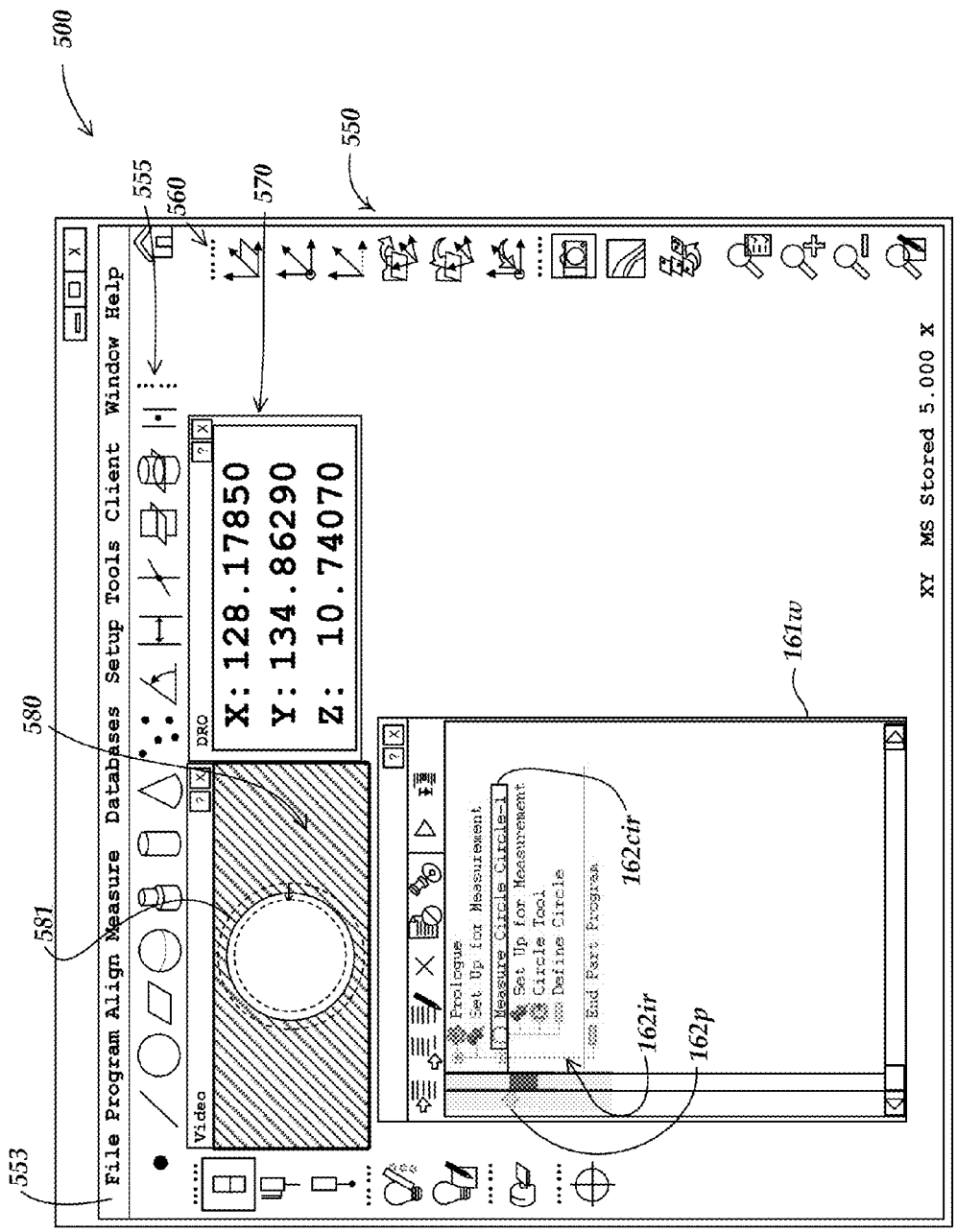
FIG. 5 shows one embodiment of user interface features and operations in a programming environment of a metrology system related to creating part program instructions and/or instruction representations that a remote reference information accessory may be responsive to according to principles disclosed herein.

FIG. 5 is a diagram 500 of a first state of a learn mode user interface 550 comprising one embodiment of an programming environment of a metrology system, including features related to creating part program instructions and/or instruction representations that a remote reference information accessory may be responsive to according to principles disclosed herein. In the embodiment shown in FIG. 5, the first state of the programming environment includes a menu bar 553, a toolbar 555, a toolbar 560, a stage position display 570 a field of view display 580, and a part program representation window 161w (also referred to as an editing window 161w in some contexts herein). The part program representation window 161w includes a set of part program instruction representations 162ir, including a current instruction representation 162cir which may be indicated as the currently active instruction representation by the position of the pointer 162p. The current instruction representation 162cir is illustrated with a surrounding box for clarity. The toolbar 555 comprises various user tools (e.g. measurement video tools) arranged horizontally in the upper portion of the user interface 550. The toolbar 560 comprises user tools (e.g., alignment and magnification tools) arranged vertically on the right hand portion of the user interface 550. The stage position display 570 displays X, Y, and Z coordinates indicating a position of the stage 32. The field of view display 580 may display a real time video image of a field of view of the machine vision inspection system 100 as imaged by the camera 260, and for reference, schematically displays in dashed outline the location where a circle tool region of interest 581 would appear as it is defined and recorded by a user (e.g. corresponding to the "circle tool" instruction representation included in the instruction representations 162ir). The user interface 550 has counterpart elements described in the previously incorporated '232 and '061 applications, and its various elements may be further understood based on description in those references.

In the first state of the programming environment shown in FIG. 5, the user has previously selected the instruction representation 162cir "Set up for Measurement", making it the current instruction representation.

Figure 6:
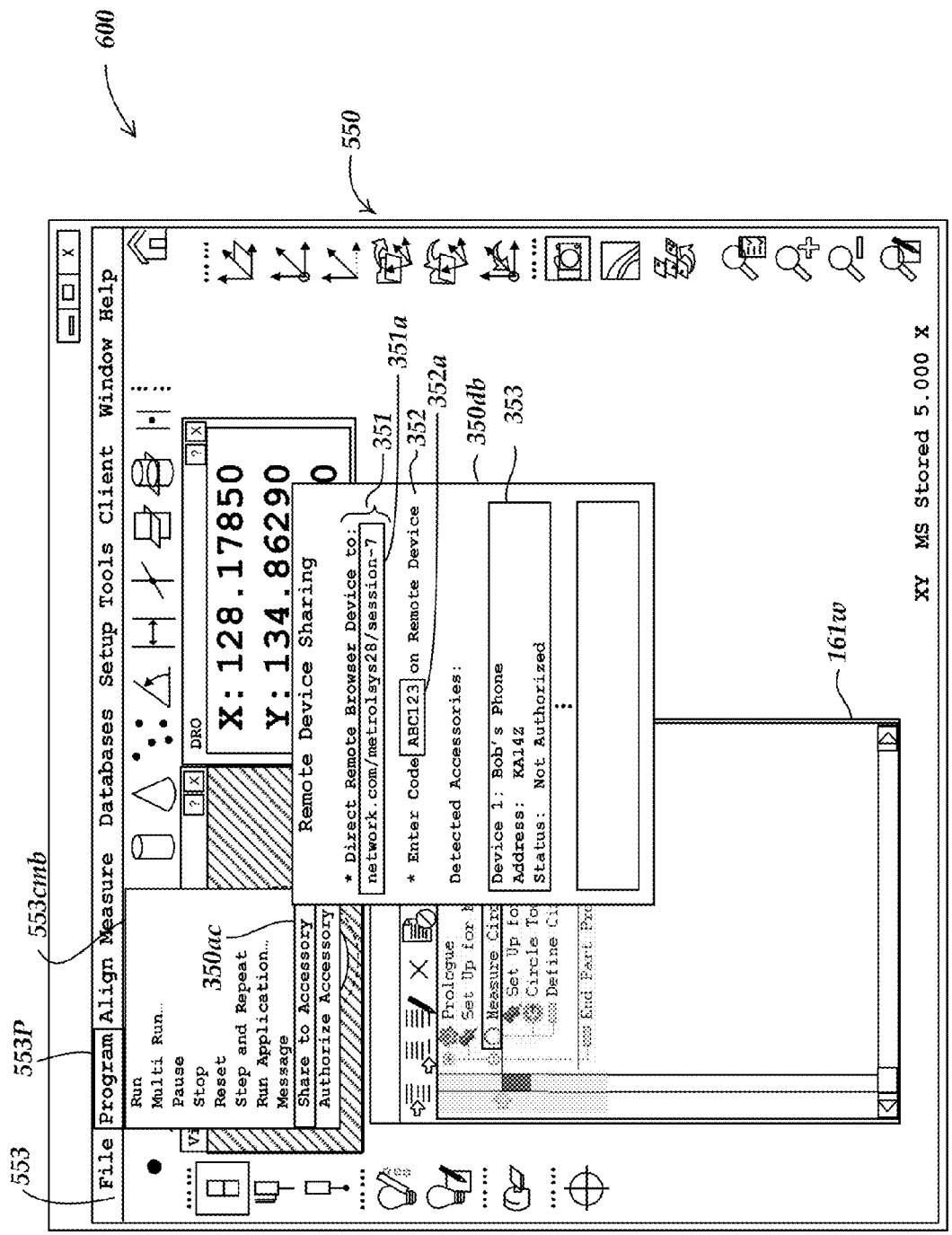
FIG. 6 shows one embodiment of user interface features in a programming environment of a metrology system usable to connect to a remote device according to principles disclosed herein.

FIG. 6 is a diagram 600 of a second state of the learn mode user interface 550 comprising one embodiment of an programming environment of a metrology system, including features related to establishing a connection with a remote device reference information accessory according to principles disclosed herein. In the second state of the programming environment shown in FIG. 6, the user has selected the "Program" menu item 550P on the menu bar 553, causing the drop-down command menu box 553cmb to appear, and then selected the "Share to Accessory" command 350ac, which has caused the "Remote Device Sharing" dialog box 350db to appear. In the embodiment shown in FIG. 6, the remote device sharing dialog box 350db includes instructions 351 and 352, to be read and performed by the user. In the state of the user interface shown in FIG. 6, it is assumed that the user has connected a remote device (e.g. their personal smart phone, or tablet, or the like) to a network that includes the metrology system which is displaying user interface 550. For example, in various embodiments, the remote device may be connected to the Internet, an intranet, a wired network, or a wireless network (e.g. using Wi-Fi), or to the metrology system itself (e.g. using a Bluetooth connection), or the like, according to known methods. In the embodiment shown in FIG. 6, it is assumed that the remote device is connected to an intranet, as is the metrology system that is displaying the user interface 550. Thus, in the exemplary method described here, the displayed instruction 351 instructs the user to enter a particular address 351a, associated with the metrology system, in the address bar of their Internet browser on the remote device (e.g. as shown in FIG. 7A). In response to the user entering that address on their remote device, the accessory interface portion 300 is notified of the presence and/or address of the remote device, and is configured to transmit a webpage (or command that triggers an analogous user interface provided by an application located on the remote device) to be displayed on the remote device (e.g. as shown in FIG. 7B). Communication between the accessory interface portion 300 and the remote device may be implemented using methods outlined below with reference to FIG. 10, for example. In the example described here, the displayed instruction 352 instructs the user to enter particular connection code 352a (generated by the accessory interface portion 300), into a code entry box included in the display on the remote device (e.g. the code entry box 431b, shown in FIG. 7B). This is easily accomplished because the user may generally be present at the metrology system, with their remote device in hand.

In various embodiments, the remote device connection dialog box 350db may include one or more remote device status boxes 353 corresponding to remote devices detected by the metrology system and/or the accessory interface portion 300, which may display respective remote devices (e.g. their identity and/or their device address on the network) and their connection status, and the like. The remote device status box 353 may be particularly valuable for example, when a remote device connects directly to the metrology system through a Bluetooth connection, or the like.

FIGS. 7 and 7B show first and second states, respectively, of one embodiment of user interface features and operations usable on a remote device reference information accessory 400 to connect that remote device to interact with a metrology system programming environment. FIG. 7A shows a remote device reference information accessory 400 (e.g. a smart phone) including a touchscreen display 400d, which provides a user interface 430 including an Internet browser interface which provides an address bar 430ab. In the first state shown in FIG. 7A, it is assumed that the user has connected the remote device 400 to the network that includes the metrology system which is displaying user interface 550 shown in FIG. 6, and has followed the displayed instruction 351 shown in FIG. 6, which instructs the user to enter the particular address 351a associated with the metrology system, in the address bar of their Internet browser on the remote device.

FIG. 7B shows a second state of the remote device 400, after the user has entered, and been connected to, the particular address 351a, as outlined in FIG. 7A. In response, the accessory interface portion 300 is notified of the presence and/or address of the remote device 400, and transmits a webpage 431wp to be displayed on the remote device as shown in FIG. 7B. In the example described here, the webpage 431wp includes an instruction 431a, which instructs the user to enter the particular connection code 352a (shown in FIG. 6) into the code entry box 431b (such that it is transmitted back to the accessory connection manager 350 of the accessory interface portion 300). This is easily accomplished because the user may generally be present at the metrology system, with their remote device in hand, observing the displays of each. The accessory connection manager 350 is configured to compare the code received from a remote device 400 to the particular connection code 352a. If the codes match, the accessory connection manager 350 connects the remote device 400 to interact with the programming environment of the metrology system to implement the various operations and features disclosed herein (e.g. as described with reference to FIGS. 8 and 9, and so on). This is one exemplary (not limiting) method of providing a method for the local user to connect their local personal device exclusively to the local metrology system, despite the presence of other remote devices and/or metrology systems on a factory intranet, or network, or the like.

Figures 8A, 8B:
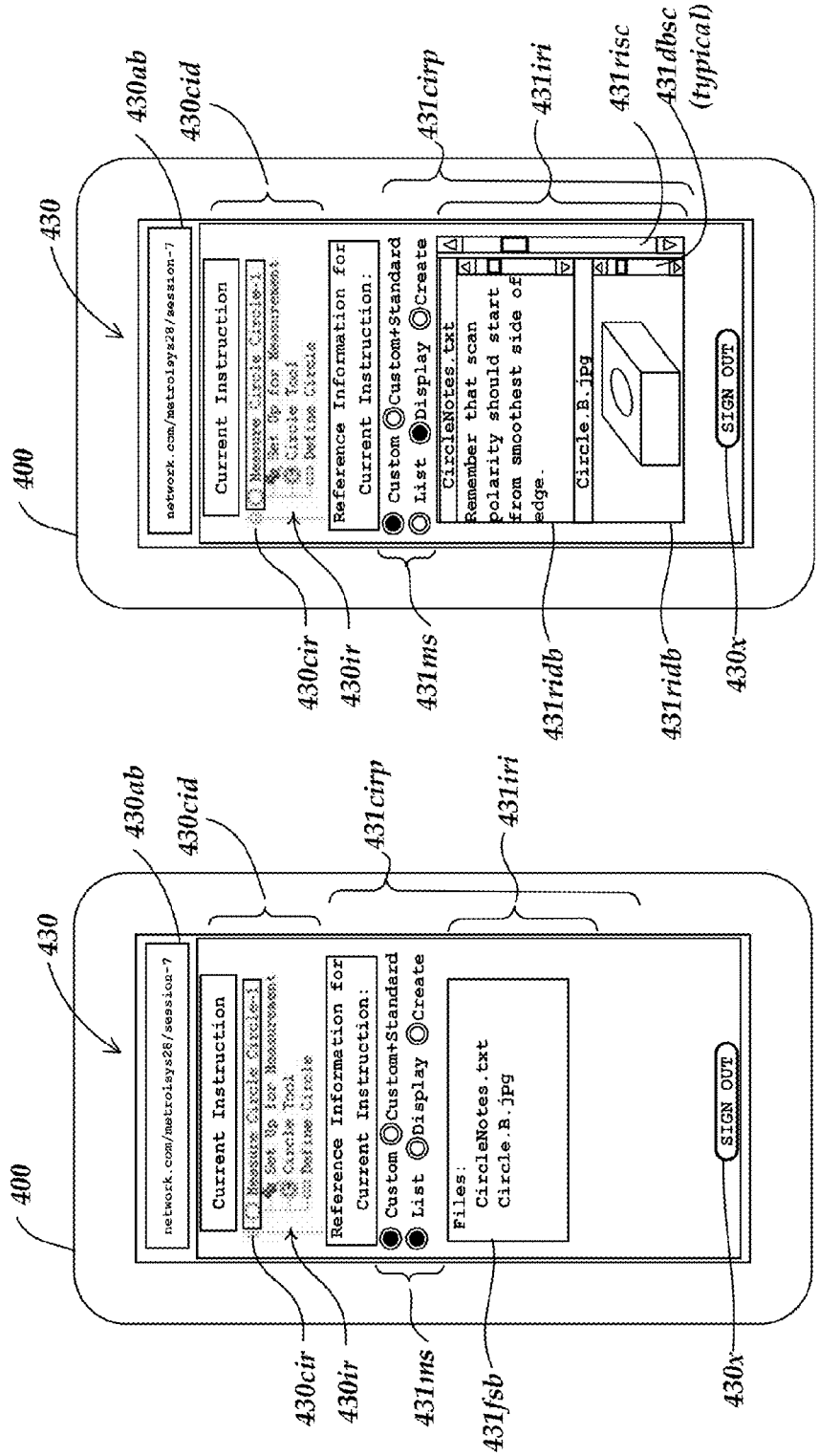
FIGS. 8A-8C show various aspects of one embodiment of user interface features and operations usable on a remote device in relation viewing and/or creating a set of reference information that it is specifically related to a generic instruction type corresponding to a current instruction representation in a programming environment.
Figure 8C:
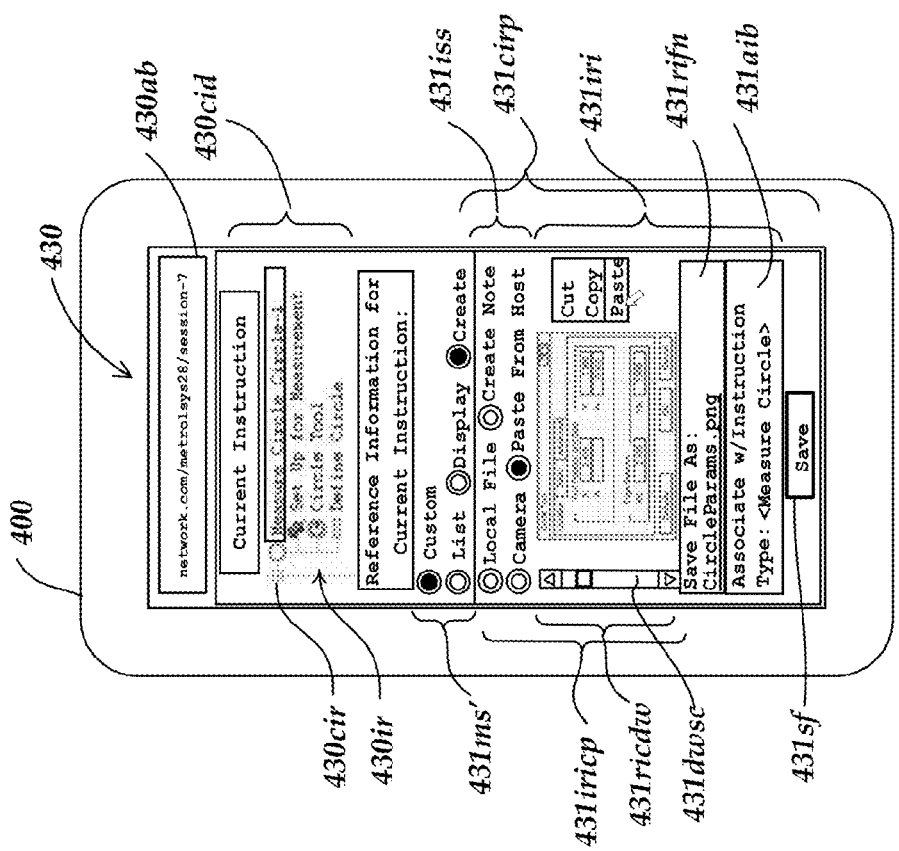

FIGS. 8A-8C show various aspects of one embodiment of user interface features and operations usable on a remote device reference information accessory 400 in relation to viewing and/or creating a set of reference information that it is specifically related to a generic instruction type corresponding to a current instruction representation in a programming environment.

FIG. 8A shows a first state of the remote device 400, after it has been connected to interact with the programming environment through the accessory interface portion 300, including a user interface 430. In various embodiments, the user interface 430 may be provided by a software routine(s) that is resident and activated locally on the remote device, or downloaded from the metrology system, or through webpage features communicated from the metrology system, or the like. In the embodiment shown in FIG. 8A, the user interface 430 includes a current instruction representation indicating portion (also referred to as a current instruction display) 430cid, a current instruction responsive portion 431cirp, and a sign out button 430x, which may be used to disconnect the remote device from the accessory interface portion 300 and/or terminate its connection to the metrology system. In the particular embodiment shown in FIG. 8A, the current instruction display 430cid includes a current instruction representation 430cir comprising an image, re-creation, or other representation of the (currently active) current instruction representation in the programming environment (e.g. the current instruction representation 162cir shown in the editing window 161w in FIG. 5), as well as surrounding instruction representations 430ir. The illustrated form of the current instruction display 430cid is exemplary only and not limiting. For example, in some embodiments the current instruction display on the remote device 400 may simply be the reproduction of only the current instruction representation, or its node number (which may also be displayed in the programming environment), or the like, in any form that increases the user's visibility of the target node and/or the generic instruction type related to the reference information that is viewed and/or created on the remote device 400. In other embodiments, the current instruction display 430cid may instead include a display indicating a generic instruction type (e.g. the "measure circle" generic instruction type) corresponding to the current instruction representation in the programming environment. In any case, the current instruction display 430cid may be frequently updated by the remote device 400 based on communication from the accessory interface portion 300, to reflect any changes in the (currently active) current instruction representation, and/or its associated "current generic instruction type", in the programming environment of the metrology system. Furthermore, in some embodiments the current instruction representation indication on the remote device 400 may simply be omitted, because the current instruction representation is indicated in the programming environment itself, and the user can see the display of both devices. However, such embodiments may be somewhat less efficient for the user.

In the embodiment shown in FIG. 8A, the current instruction responsive portion 431cirp includes mode selection buttons 431ms, and an instruction reference information portion 431iri. The mode selection buttons 431ms include a "Custom" selection button that causes only customized reference information to be displayed for a current generic instruction type, and a "Custom+Standard" selection button that causes standard reference information (e.g. a section of standard "help" documentation corresponding to the current generic instruction type) to be displayed along with any customized reference information. It should be appreciated that in some embodiments, the remote device 400 may include only customized reference, and the "Custom" and "Custom+Standard" selection buttons may be omitted.

The mode selection buttons 431ms also include "List", and "Display" buttons, which control whether the user interface displays existing reference information associated with the current generic instruction type as a file list (e.g. as shown in FIG. 8A), or as a display of the file contents (e.g. as shown in FIG. 8B), respectively. The mode selection buttons 431ms also include a "Create" button, which causes a user interface to be displayed which is suitable for creating reference information associated with the current generic instruction type (e.g. as shown in FIG. 8C). In some embodiments, the effect of the mode selection buttons 431ms may persist as the current instruction representation (and its corresponding current generic instruction type) is changed in the programming environment.

In the state of the user interface 430 shown in FIG. 8A, the "Custom" and "List" mode buttons have been selected. In the illustrated embodiment, this results in a file selection box 431fsb included in the instruction reference information portion 431iri displaying a list of existing custom reference information files previously stored on the remote device in association with the current generic instruction type. Files in the list may be selected and opened to display their contents in the user interface 430 (e.g. opened using a default program and/or window that corresponds to their file extension, for example), according to known methods.

In the state of the user interface 430 shown in FIG. 8B, the "Custom" and "Display" mode buttons have been selected. In the illustrated embodiment, this results in one or more reference information display boxes 431ridb included in the instruction reference information portion 431iri displaying the contents of existing custom reference information files previously stored on the remote device in association with the current generic instruction type. The files may be opened and displayed using a default program and/or window that corresponds to their file extension, for example, according to known methods. The remote device 400 may have a limited display size. In such a case, it may be beneficial for the reference information display boxes 431ridb to include display box scroll controls 431dbsc for scrolling through individual file contents, and/or for the instruction reference information portion 431iri to include a reference information scroll control 431risc for scrolling between the various files.

It should be appreciated that the instruction reference information portion 431iri of user interface may be frequently updated by the remote device 400 based on communication from the accessory interface portion 300, to reflect any changes in the (currently active) current instruction representation, and/or its associated "current generic instruction type", in the programming environment of the metrology system. That is, the user interface display of the reference information files and/or file contents associated with the current generic instruction type corresponding to the current instruction representation in the programming environment may be dynamically updated on the remote device 400.

In the state of the user interface 430 shown in FIG. 8C, the "Create" mode button has been selected, for creating customized reference information associated with the current generic instruction type. In the illustrated embodiment, this results in only the "Custom" mode button being displayed. In the embodiment shown in FIG. 8C, the current instruction responsive portion 431cirp includes user interface elements suitable for creating and/or editing reference information, which may be automatically associated with the current generic instruction type. For example, the instruction reference information portion 431iri includes a reference information customization and display window 431ricdw that may include a display window scroll control 431dwsc (described in greater detail below), a reference information file name input box 431rifn (pertaining to the information included in the window 431lricdw), an associated instruction confirmation box 431aib, and a save file button 431sf that causes the information included in the window 431ricdw to be saved as indicated in the file name box 431rifn and in association with the current generic instruction type which may be an automatic default entry in the associated instruction confirmation box 431aib (or a manually entered override entry), in one embodiment. In various embodiments the association may be provided using any suitable known method, such as a lookup table, or using a filename or extension convention, or using suitable designations in an XML instruction/header, or the like.

An instruction reference information customization portion 431iricp of the user interface 430 includes the reference information customization and display window 431ricdw and reference information source selector buttons 431iss, which may include "Local File", "Create Note", "Camera", and/or "Paste from Host" buttons, for example.

A user may select the "local file" button, which in one exemplary embodiment may open a file browser that allows them to select a desired file for listing and/or opening and editing in the customization and display window 431*ricdw*.

A user may select the "create note" button, which in one exemplary embodiment may open an operational text editor in the customization and display window 431*ricdw* (which may appear similar to the "CircleNotes.txt" display box 431*ridb*, shown in FIG. 8B, for example).

A user may select the "camera" button, if an image is desired as a reference information file. The camera button may be operated to access image acquisition and storage features that already exist on the remote device 400. The resulting image may then be treated as a reference information file, and/or opened in the customization and display window 431*ricdw*, as outlined above. Of course, if other sensor capabilities exist in the remote device 400, these may be accessed and used to provide reference information in an analogous manner.

Figure 9:
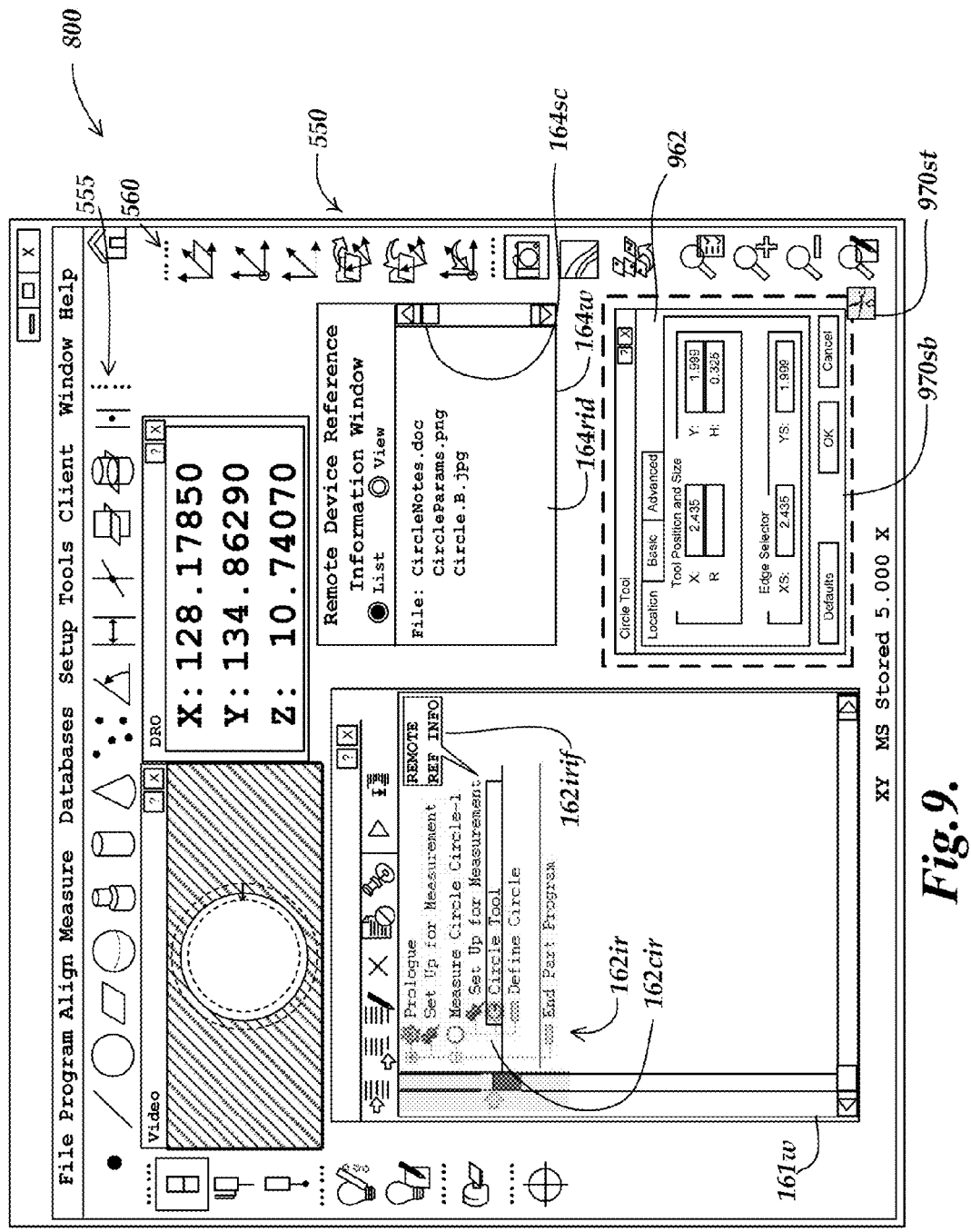
FIG. 9 shows one embodiment of various user interface features and operations in a programming environment, related to interacting with a remote device for the purpose of viewing and/or creating a set of reference information associated with a generic instruction type.

A user may select the "paste from host" button, if reference information is desired to be transferred from the programming environment that is connected to the remote device 400. The host metrology system that is connected to the remote device 400 may be operated using features that already exist on the metrology system and/or its associated computer operating system and programs to select and transform or save or cut or copy information from the programming environment, or help documentation, or the like. For example, FIG. 9 shows a circle tool parameter window 962 being selected by the selection box 970*sb* of a snipping tool 970*st*, which operates to put screen captured image of the selection box contents onto a clipboard of the host metrology system, according to known methods. In the embodiment illustrated in FIG. 8C, the "paste from host" button causes the display window 431*ricdw* to display the clipboard contents of the host metrology system when a cursor of the remote device 400 is placed in the customization and display window 431*ricdw*, the "cut, copy, paste" menu is displayed according to known methods, and the "paste" command is activated on the menu. The resulting contents may then be treated as a reference information file, and/or edited in customization and display window 431*ricdw*, as outlined above. Editing may be performed using various tools or operations provided in the user interface 430 and/or tools or operations otherwise included in the remote device 400.

In some embodiments, various features or operations of the remote device 400 outlined above with reference to FIGS. 8A-8C may comprise features or operations that may be implemented using applications previously resident on the remote device 400 (and not normally associated with the metrology system). As such, an unskilled user may easily use a personal device as a remote device reference information accessory 400, with the highly desirable benefits of no special training requirements and with minimal disruption to their personal device.

FIG. 9 is a diagram 900 of the learn mode user interface 550 shown in FIG. 5, comprising one embodiment of an programming environment of a metrology system, including features related to displaying a set of reference information provided by the remote device 400 in associated with a current instruction representation and/or its corresponding current generic instruction type. In the state of the programming environment shown in FIG. 9, the current instruction representation 162*cir* is the "circle tool" instruction representation. In this example, it is assumed that the remote device 400 includes a set of reference information files associated with the current generic instruction type, which in this example is the "circle tool" instruction type. Furthermore, the remote device 400 is configured such that, when a set of reference information is available for current generic instruction type, it automatically broadcasts a notice of this information availability to the programming environment. In this example the programming environment is configured to display the instruction reference information available flag 162*irif* proximate to the current instruction representation, as illustrated. In the state shown in FIG. 9, the user has selected and activated the instruction reference information available flag 162*irif*, which in this example causes the remote device reference information window 164*w* to appear, including a reference information display 164*rid* corresponding to the instruction reference information portion 431*iri* of the remote device 400, as previously outlined with reference to FIGS. 8A-8C. In various implementations, the displayed reference information files and/or their contents may be downloaded using features of the remote device reference information window 164*w*, according to known methods and as outlined further below with reference to FIGS. 10 and 11. In various embodiments, the remote device reference information window 164*w* may be resized, moved, minimized, closed, etc., according to known methods. Alternatively, the window 164*w* may be omitted, and remote device reference information files may be automatically opened in appropriate default programs on the host metrology system according to known methods.

Figure 10:
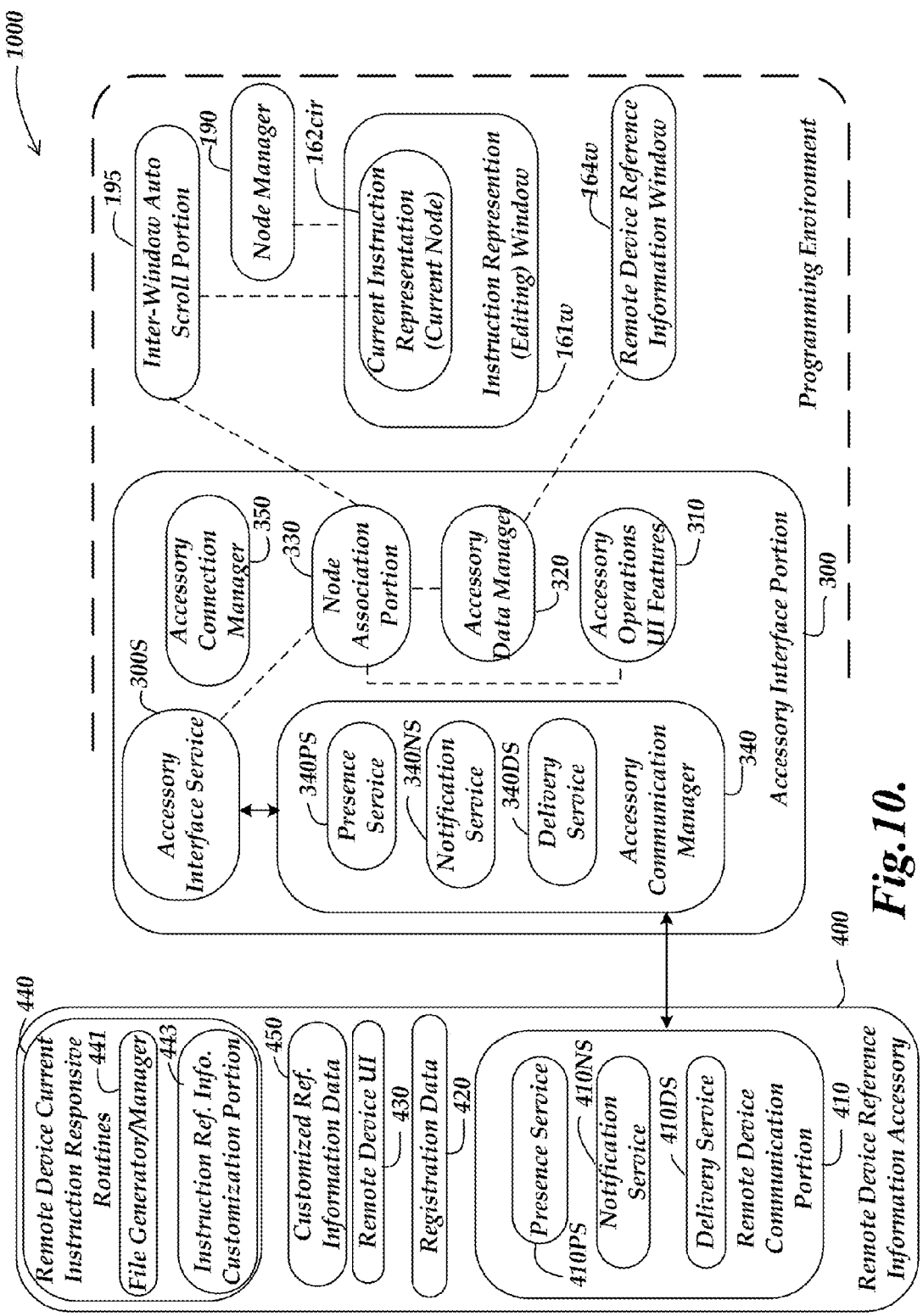
FIG. 10 shows a block diagram of one exemplary implementation of various features and operations of a remote device reference information accessory and an accessory interface portion of a programming environment using web services to implement various features disclosed herein.

FIG. 10 shows a block diagram 1000 of one exemplary implementation of various features and operations of a remote device reference information accessory 400 and an accessory interface portion of a programming environment (e.g. the accessory interface portion 300) using web services to implement various features disclosed herein.

Generally speaking, a web service is a collection of protocols and standards used for exchanging data between applications or systems. Software applications written in various programming languages, running on various platforms, can use web services to exchange data over computer networks (e.g. like the Internet), in a manner similar to inter-process communication a single computer. This interoperability is due to the use of open standards (e.g. TCP/IP, HTTP, Java, HTML and XML). As is known, a web service may be self-describing via common XML grammar, and may be discoverable over a network via a simple find mechanism. For example, a client invokes a web service by sending XML message, and then waits for corresponding XML response. A basic web service platform is XML+HTTP. Standard web services may work using the following known components, for example: Simple Object Access Protocol (SOAP); Universal Description, Discovery and Integration (UDDI); and Web Services Description Language (WSDL). The design and use of web services is known to software developers, and may be implemented based on known techniques by those who are skilled in the art related to providing a programming environment for a metrology system. Thus, it will be appreciated that the features and operations described below with reference to FIG. 10, as well as other features and operations disclosed herein, may be implemented using known web service programming and operation methods, which need not be described in detail here.

FIG. 10 shows the previously described remote device reference information accessory 400, accessory interface portion 300, and a few elements of the previously described programming environment which are relevant to the present description, including the node manager 190, instruction representation (or editing) window 161*w*, and remote device reference information window 164*w*. In the embodiment shown in FIG. 10, the previously described remote device communication portion 410 may comprise web service elements including a presence service 410PS, the notification service 410NS, and delivery service 410DS. Similarly, the previously described accessory communication manager 340 may comprise web service elements including a presence service 340PS, the notification service 340NS, and delivery service 340DS. The previously described accessory interface portion 300 may comprise web service elements including an accessory interface service 300S.

Following is one representative example of operations in accordance with the present invention, using Web services. It will be understood that this example is only representative, and not limiting. In operation, the remote device 400 establishes a connection to a network that is also connected to the metrology system and/or the programming environment, including the accessory interface portion 300. The remote device 400 may then contact the presence service 340PS of the accessory communication manager 340. The presence service 340PS provides information to the accessory interface service 300S, and therefore the remote device 400 contacts the presence service 340PS to supply information about the remote device 400 (e.g. so that the accessory interface service 300S can supply webpage formats and other data to the remote device 400 in a compatible format, and so on). The remote device 400 notifies the presence service 340PS that it is connected to the network. The remote device 400 may bundle its device registration information into a SOAP message, for example, and may include useful information such as its interface or display characteristics, and the like. The SOAP message may be sent to the presence service 340PS as the body of an HTTP POST request, for example. The presence service 340PS and/or the accessory interface service 300S may unpack the SOAP request and convert the information into data, instructions, or commands that the other elements of the accessory interface portion 300 can understand. As a result of the above operations, initially, the accessory interface portion 300 recognizes that the remote device 400 is not yet connected to the programming environment, and limits the type of interactions permitted with the remote device 400 until the user of the programming environment requests connection for the remote device 400, using the previously outlined "Connect to Accessory" command, for example. Then, the accessory connection manager 350 and at other elements of the accessory interface portion 300, perform the related connection operations, for example, as outlined above with reference to FIGS. 6, 7A and 7B. The elements of the accessory interface portion 300 interact with the remote device 400 through the accessory interface service 300S, which converts their data, instructions, or commands into information in a form that the remote device 400 can understand and use, and instructs the delivery service 340DS to deliver the information to the remote device 400. Responses in interactions from the remote device 400 may be delivered back to the accessory interface portion 300 by the delivery service 410DS, and converted in the accessory interface service 300S to a form that the various elements of the accessory interface portion 300 can understand and use. In this way, operations as outlined above with reference to FIGS. 6-9, and other operations and features disclosed herein, may be accomplished by a relatively unskilled users when using a variety of remote devices 400 that are not normally associated with a metrology system.

Regarding the indication of a current instruction representation 162cir on the remote device 400, in one embodiment, this may be implemented using the previously described node manager 190, inter-window auto scroll portion 195, and node Association portion 330. As previously indicated, the node manager 190 is responsible for assigning and/or managing node numbers that are assigned to nodes (e.g. instruction representations) in a part program. The inter-window auto scroll portion 195 may utilize the node numbers to display associated part program elements and corresponding editing functions in different windows, routines, or applications, at the same time. In other words, the inter-window auto scroll portion 195 may cause respective windows to automatically scroll to the elements that correspond to the relevant node number, and to execute operations associated with that node number and/or other information sent in association with the node number. One exemplary method and/or implementation of inter-window communication is described below, with reference to FIG. 11, wherein the inter-window auto scroll portion 195 sends auto scroll notifications AS to various connected elements, including the node Association portion 330, when it is notified of selection events SE in various connected elements. For example, a selection event SE occurs in the program representation window 161w each time the user changes the current (currently active) instruction representation 162cir to a new or different instruction representation. In response to receiving an auto scroll notification AS, the node association portion 330 may update its "current node number" and may also identify the current generic instruction type associated with the current instruction (if any) of the current node number. In addition, the node association portion 330 may notify the accessory operations user interface features 310 to send updated current instruction display information (e.g. indicating the new current instruction representation), and an updated current generic instruction type (if this information is not determined by routines in the remote device 400, itself, based on the updated current instruction display information), to the remote device 400. The accessory operations user interface features 310 may then prepare the required updated current instruction display information (including the updated current generic instruction type, if required), and send it to the accessory interface service 300S for the proper formatting, and delivery to the remote device 400. In some embodiments, the accessory interface service 300S may use the notification service 340NS to notify the remote device 400 that such a delivery is available, whereupon the remote device 400 may request the delivery when it is compatible with its ongoing native operations.

Regarding the sending of a set of reference information from the remote device 400 to the accessory interface portion 300, the related previously described features and operations may be implemented as follows, in one embodiment. If a set of reference information is available for the current generic instruction type on the remote device, this may cause the notification service 410NS of the remote device 400 to issue a notification to the accessory interface portion 300 that such a delivery is available, whereupon the accessory interface portion 300 may request the delivery when it is compatible with its ongoing operations. When set of reference information is delivered, the accessory interface service 300S may prepare the information in a form usable by the accessory data manager 320 and/or the programming environment. The accessory data manager 320 may associate the set of reference information with the current node number, may temporarily or permanently download and store the set of reference information in association with the current node number and/or the current generic instruction type in some embodiments, and may cause the editing window 161*w* to display the instruction reference information flag 162*irif*, as previously outlined with reference to FIG. 9, in some embodiments.

Regarding the implementation of various web service methods, in addition to the large body of web surface teaching literature, U.S. Pat. Nos. 7,506,059; 8,346,929; 6,732,111; and 8,539,061, which are hereby incorporated herein by reference in its entirety, describe various methods which may be adapted to provide features and operations described with reference to FIG. 10, as well as to implement various other features and operations disclosed herein.

Figure 11:
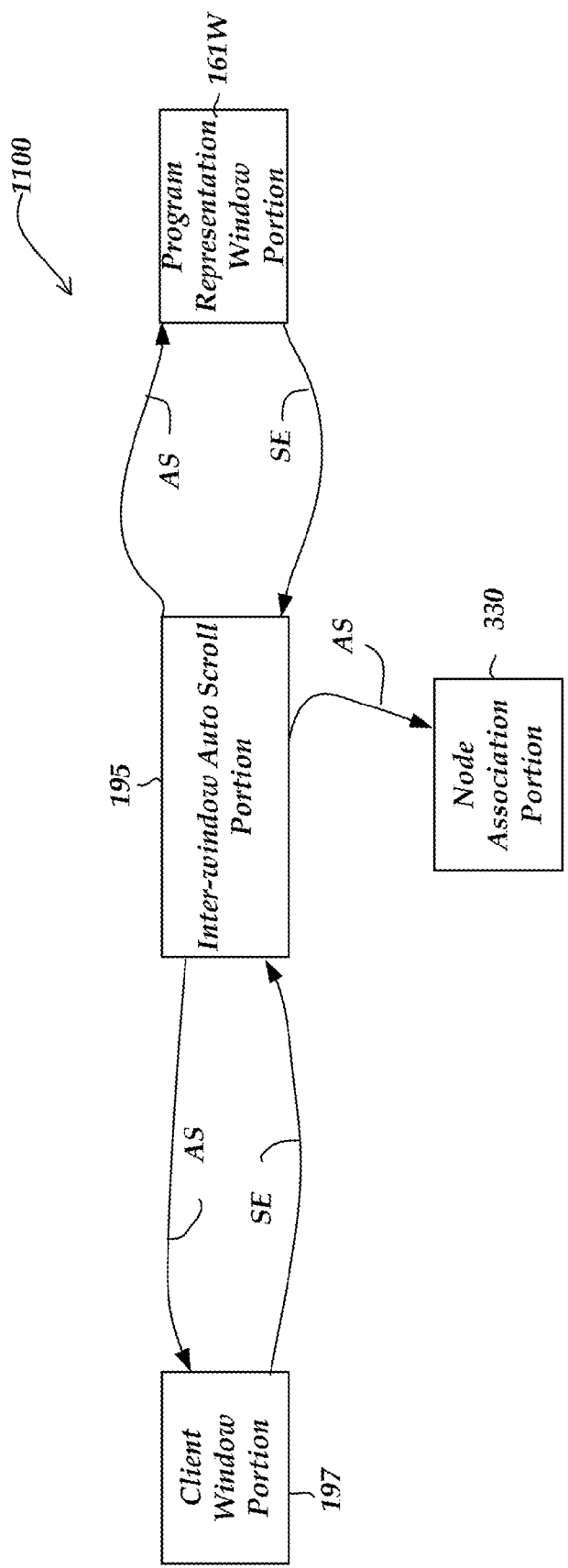
FIG. 11 shows one embodiment of node identification and coordination of operations between windows, applications, or devices, usable in a programming environment in conjunction with various features and operations disclosed herein related to providing reference information associated with an instruction representation in the programming environment.

FIG. 11 is a functional schematic representation 1100 showing one embodiment of node identification and coordination of operations between windows, applications, or devices, usable in a programming environment in conjunction with various features and operations disclosed herein related to providing reference information associated with an instruction representation in the programming environment. FIG. 11 schematically shows an inter-window auto scroll portion 195, a program representation (editing) window portion 161*w*, a client window portion 197 (e.g. another window in the programming environment), and the previously outlined node association portion 330 of the accessory interface portion 300. It should be understood that a "window portion" or "window" may include a displayed user interface, as well as its associated features and the underlying routines which provide its operations. It should also be understood that although the word "scroll" or "auto scroll" may be used herein, these words are used for convenience only, and are not limiting. More generally, an "auto scrolled" element may be made visible in its respective window, by any convenient and/or known method, including simply regenerating the window with the desired contents, or the like.

In the embodiment shown in FIG. 11, the inter-window auto scroll portion 195 interacts with window portions and the node association portion 330 through an auto scroll notification AS, and interacts with respective window portions through respective a window selection event notifications SE. The various selection event notifications SE are triggered independently. That is, any window that is the host of selection of an element that is associated with a node number may issue a selection event notification SE in response to that selection, based on a routine or operations of that window that are triggered by the selection event. For example, a selection event occurs in the program representation window 161*w* each time the user changes the current (currently active) instruction representation 162*cir* to a new or different instruction representation. In contrast, in various embodiments, the auto scroll notifications AS to each applicable window are triggered in response to any selection event notification received by the inter-window auto scroll portion 195, and are generally sent to all applicable windows and the node association portion 330. The auto scroll notifications AS are based on a routine or operations of the Inter Window Auto Scroll Portion 195 that are triggered by a selection event notification SE. The selection event notification SE may include the identifier or node number of the selected element (e.g. the identifier of the new current instruction representation), and in some embodiments may include an identification of the generic instruction type of the current node or instruction representation (e.g. as may be determined according to known methods in the recorder/translator 155 shown in FIG. 2, for example), any or all of which may be passed through the auto scroll notification AS. As previously indicated, in response to receiving an auto scroll notification AS, the node association portion 330 may update its current node number and/or current generic instruction type and notify the accessory data manager 320 and/or remote device 400 through the accessory interface service 300S, that a new current node number, and/or new current instruction representation, and/or new current generic instruction type is in effect, such that appropriate operations can be performed in each element that receives the notification. In addition, in some embodiments, the node association portion 330 may notify the accessory operations user interface features 310 to send communication that supports an updated display indicating the new current instruction representation on the remote device 400.

In one embodiment, FIG. 11 may be implemented using known "publisher-subscriber" methods, which are sometimes implemented using XML like languages (e.g., as used for notifications between web pages). In various embodiments, a publisher-subscriber method may be implemented by adapting methods such as a list-based method, or a broadcast-based method, or a content-based method to support the features disclosed herein. In a machine vision inspection system, the publishers and subscribers are generally located in the same processing space, and it is possible for the identity of the "subscriber" windows to be known by the "publisher." Applicable to such cases, U.S. Pat. No. 8,028,085 ("the '085 patent"), which is hereby incorporated herein by reference in its entirety, describes low latency methods which may be adapted to support the features disclosed with reference to FIG. 11.

Figure 12:
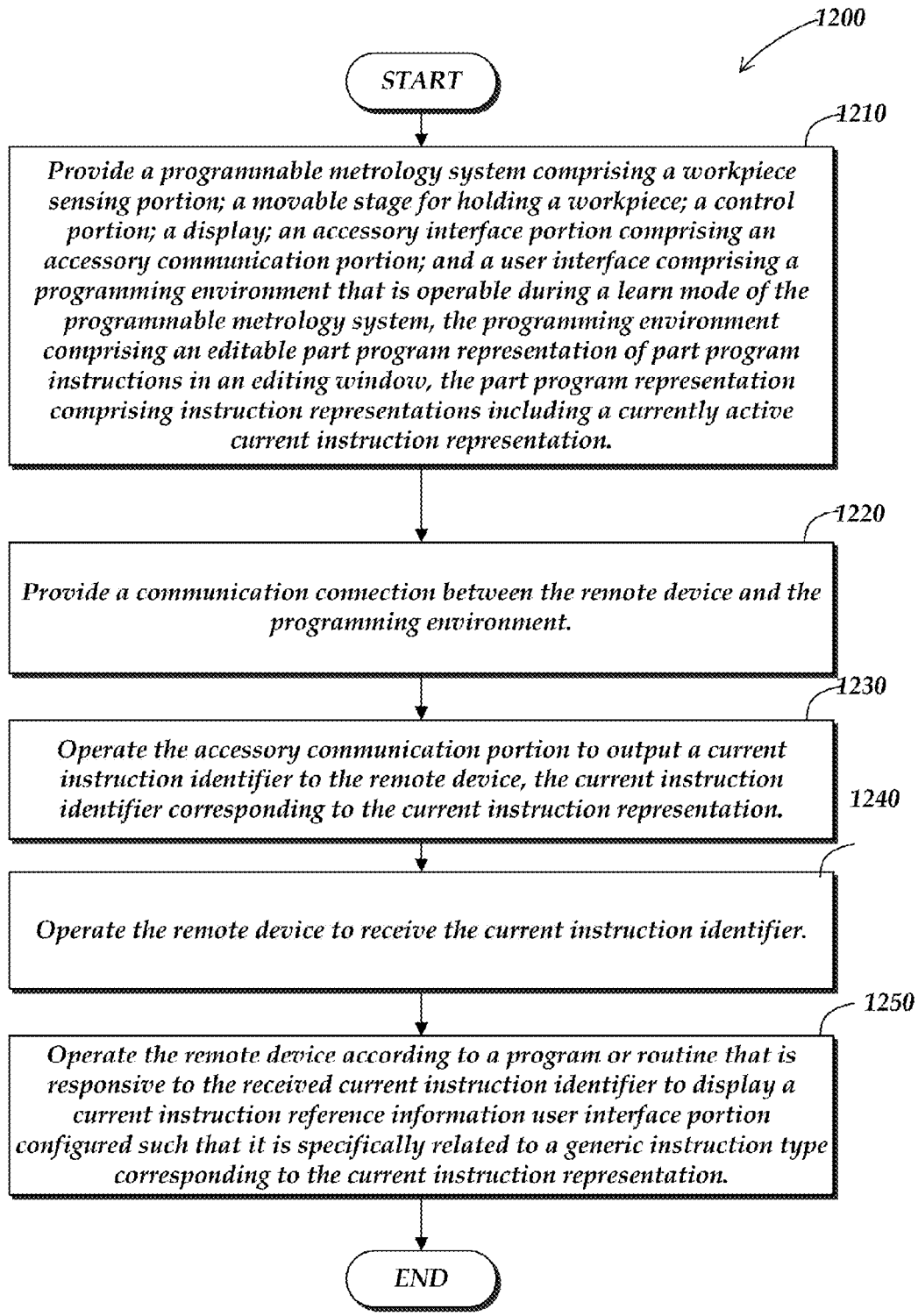
FIG. 12 is a flow diagram showing one exemplary embodiment of a method for operating a remote device in relation to a programming environment of a programmable metrology system according to features and operations disclosed herein, wherein the remote device is responsive to a current instruction representation in the programming environment to display reference information that it is specifically related to a generic instruction type corresponding to the current instruction representation.

FIG. 12 is a flow diagram 1200 showing one exemplary embodiment of a method for operating a remote device in relation to a programming environment of a programmable metrology system according to features and operations disclosed herein, wherein the remote device is responsive to a current instruction representation in the programming environment to display reference information that it is specifically related to a generic instruction type corresponding to the current instruction representation.

At a block 1210, a programmable metrology system is provided comprising a workpiece sensing portion; a movable stage for holding a workpiece; a control portion; a display; an accessory interface portion comprising an accessory communication portion; and a user interface comprising a programming environment that is operable during a learn mode of the programmable metrology system, the programming environment comprising an editable part program representation of part program instructions in an editing window, the part program representation comprising instruction representations including a currently active current instruction representation. At a block 1220, a communication connection is provided between the remote device and the programming environment. At a block 1230, the accessory communication portion is operated to output a current instruction identifier to the remote device, the current instruction identifier corresponding to the current instruction representation. At a block 1240, the remote device is operated to receive the current instruction identifier. At a block 1250, the remote device is operated according to a program or routine that is responsive to the received current instruction identifier to display a current instruction reference information user interface portion configured such that it is specifically related to a generic instruction type corresponding to the current instruction representation.

It will be understood that the method outlined above with reference to FIG. 12 is exemplary only, and not limiting. The various elements may be performed in various combinations and implemented in various embodiments using the various combinations of the features and operations outlined herein.

In some embodiments, the programming environment that interacts with the remote device may be provided based on a simulator and/or simulation of a corresponding metrology system, and the actual motion control elements and other physical apparatus that moves the probe, as well as the workpiece, may be simulated.

From the foregoing, it will be appreciated that specific embodiments of the invention have been described herein for purposes of illustration, but that various modifications may be made without deviating from the scope of the invention.

The embodiments of the invention in which an exclusive property or privilege is claimed are defined as follows:

1. A method for operating a remote device in relation to a programming environment of a programmable metrology system comprising a workpiece sensing portion; a movable stage for holding a workpiece; a control portion; a display; an accessory interface portion comprising an accessory communication portion; and a user interface comprising a programming environment that is operable during a learn mode of the programmable metrology system, the programming environment comprising an editable part program representation of part program instructions in an editing window on the display of the metrology system, the part program representation comprising instruction representations including a currently active current instruction representation, the method comprising:
storing on the remote device reference information comprising a user note related to part programming, wherein the user note is provided by a user of the remote device and is to be displayed in association with instruction representations that are of a generic instruction type;
providing a communication connection between the remote device and the programming environment;
operating the accessory communication portion to output a current instruction identifier to the remote device, the current instruction identifier corresponding to the currently active current instruction representation which is of the generic instruction type;
operating the remote device to receive the current instruction identifier; and
operating the remote device according to at least one of a program or routine that is responsive to the received current instruction identifier to display the user note in response to the currently active current instruction representation being of the generic instruction type, wherein the user note is displayed in a current instruction reference information user interface portion on a display of the remote device.

2. The method of claim 1, wherein:
the program or routine that is responsive to the received current instruction identifier automatically displays the user note in the current instruction reference information user interface portion in response to the currently active current instruction representation being of the generic instruction type.

3. The method of claim 1, wherein:
the current instruction identifier comprises at least one of the currently active current instruction representation; a corresponding current part program instruction, or the generic instruction type corresponding to the currently active current instruction representation.

4. The method of claim 1, further comprising operating the remote device to automatically indicate at least one of the currently active current instruction representation or the generic instruction type corresponding to the currently active current instruction representation in a display of the remote device.

5. The method of claim 1, wherein the current instruction reference information user interface portion comprises at least one of a) a reference information selection portion which identifies reference information including the user note stored on the remote device in association with the generic instruction type corresponding to the currently active current instruction representation, b) a reference information display area which displays reference information including the user note stored on the remote device in association with the generic instruction type corresponding to the currently active current instruction representation, or c) a reference information creation portion usable to configure custom reference information including the user note associated with the generic instruction type corresponding to the currently active current instruction representation.

6. The method of claim 5, wherein the current instruction reference information user interface portion comprises at least c) the reference information creation portion, and the reference information creation portion is further usable to store the reference information including the user note in association with the generic instruction type corresponding to the currently active current instruction representation.

7. The method of claim 6, wherein the reference information creation portion includes a duplication element operable to duplicate the currently active current instruction representation for use in the configured custom reference information.

8. The method of claim 5, wherein the current instruction reference information user interface portion comprises at least a) the reference information selection portion which identifies reference information stored on the remote device in association with the generic instruction type corresponding to the currently active current instruction representation, wherein the identified reference information comprises custom reference information including the user note previously configured by a user of the remote device.

9. The method of claim 8, wherein the reference information selection portion includes a configuration wherein the reference information selection portion is configured to identify reference information consisting of custom reference information including the user note previously configured by a user of the remote device.

10. The method of claim 5, wherein the current instruction reference information user interface portion comprises at least b) the reference information display area, and the reference information display area includes a configuration wherein the reference information display area is configured to display reference information consisting of custom reference information including the user note previously configured by a user of the remote device.

11. The method of claim 1, wherein,
reference information stored on the remote device in association with the generic instruction type corresponding to the currently active current instruction representation includes custom reference information, and the method further comprises:
operating the programming environment to display at least one of i) a remote reference information available indicator, or ii) a copy of the custom reference information stored on the remote device in association with the generic instruction type corresponding to the currently active current instruction representation.

12. The method of claim 1, wherein interaction between the remote device and the programming environment of the programmable metrology system is implemented, at least in part, using web services.

13. The method of claim 1, wherein the remote device is a portable device not specifically associated with the programmable metrology system, and providing a connection between the remote device and the programming environment comprises connecting the remote device to a network usable to connect to the programmable metrology system.

14. The method of claim 13, wherein the remote device is at least one of a smart phone or a portable computer.

15. The method of claim 1, wherein the accessory interface portion of the metrology system comprises an accessory connection portion, and
providing the connection between the remote device and the programming environment comprises operating the accessory connection portion to connect the remote device to the programming environment.

16. The method of claim 1, wherein the accessory connection portion comprises a connection user interface displayed in the programming environment, and the connection user interface comprises instructions to be executed using the remote device.

17. A system comprising a remote device to be operated in relation to a programming environment of a programmable metrology system comprising a workpiece sensing portion; a movable stage for holding a workpiece; a control portion; a display; and a user interface comprising a programming environment that is operable during a learn mode of the programmable metrology system, the programming environment comprising an editable part program representation of part program instructions in an editing window on the display of the metrology system, the part program representation comprising instruction representations including a currently active current instruction representation,
the remote device comprising:
a remote device communication portion configured to provide a connection between the remote device and the programming environment;
a display portion;
a user interface;
a memory storing programmed instructions; and
a processor configured to execute the programmed instructions to perform operations including at least:
operating the remote device to store reference information comprising a user note related to part programming, wherein the user note is provided by a user of the remote device and is to be displayed in association with instruction representations that are of a generic instruction type;
operating the remote device to receive a current instruction identifier from the programming environment, the current instruction identifier corresponding to the currently active current instruction representation which is of the generic instruction type; and
operating the remote device such that it is responsive to the received current instruction identifier to display the user note in response to the currently active current instruction representation being of the generic instruction type, wherein the user note is displayed in a current instruction reference information user interface portion on the display portion of the remote device.

18. The system of claim 17, wherein:
operating the remote device such that it is responsive to the received current instruction identifier to display the user note in the current instruction reference information user interface portion comprises operating the remote device such that it is responsive to the received current instruction identifier to automatically display the user note in the current instruction reference information user interface portion in response to the currently active current instruction representation being of the generic instruction type.

19. The system of claim 17, wherein the current instruction reference information user interface portion comprises at least one of a) a reference information selection portion which identifies reference information including the user note stored on the remote device in association with the generic instruction type corresponding to the currently active current instruction representation, b) a reference information display area which displays reference information including the user note stored on the remote device in association with the generic instruction type corresponding to the currently active current instruction representation, or c) a reference information creation portion usable to configure custom reference information including the user note associated with the generic instruction type corresponding to the currently active current instruction representation.

20. The system of claim 17, wherein the remote device is a portable device not specifically associated with the programmable metrology system, and the remote device communication portion is configured to provide a connection to a network usable to connect to the programmable metrology system.

* * * * *